United States Patent [19]
Adelmann et al.

[11] Patent Number: 4,748,620
[45] Date of Patent: May 31, 1988

[54] TIME STAMP AND PACKET VIRTUAL SEQUENCE NUMBERING FOR RECONSTRUCTING INFORMATION SIGNALS FROM PACKETS

[75] Inventors: Harry W. Adelmann, Neptune; James D. Tomcik, Aberdeen, both of N.J.

[73] Assignee: American Telephone and Telegraph Company, AT&T Bell Laboratories, Murray Hill, N.J.

[21] Appl. No.: 834,612

[22] Filed: Feb. 28, 1986

[51] Int. Cl.[4] .............................................. H04J 3/24
[52] U.S. Cl. .................................................... 370/94
[58] Field of Search ...................... 370/58, 60, 94, 108

[56] References Cited

U.S. PATENT DOCUMENTS

| | | | |
|---|---|---|---|
| 4,100,377 | 7/1978 | Flanagan | 370/94 |
| 4,287,592 | 9/1981 | Paulish et al. | 370/94 |
| 4,317,195 | 2/1982 | Barberis et al. | 370/94 |
| 4,437,087 | 5/1984 | Petr | 340/347 |
| 4,450,554 | 5/1984 | Steensma et al. | 370/4 |
| 4,475,213 | 10/1984 | Medaugh | 375/27 |
| 4,491,945 | 1/1985 | Turner | 370/60 |
| 4,506,358 | 3/1985 | Montgomery | 370/60 |
| 4,538,259 | 8/1985 | Moore | 370/60 |
| 4,551,833 | 11/1985 | Turner | 370/60 |
| 4,617,657 | 10/1986 | Drynan et al. | 370/60 |

OTHER PUBLICATIONS

CCITT Recommendation, Fascicle III.3–Rec. G.721, 7.2 Coding of Analog Signals by Methods Other Than PCM, "32 kbit/s Adaptive Differential Pulse Code Modulation (ADPCM)", Malaga–Torremolinos, 1984, pp. 125 through 159.

"Embedded DPCM for Variable Bit Rate Transmission," David J. Goodman, *IEEE Transactions on Communications*, vol. COM-28, No. 7, Jul. 1980, pp. 1040–1046.

"An Integrated Voice/Data Network Architecture Using Virtual Circuit Switching", N. C. Huang, Globecom'85, IEEE Global Telecommunications Conference, Dec. 2–5, 1985, New Orleans, La., Conference Record, vol. 2, pp. 542–546.

*Primary Examiner*—Douglas W. Olms
*Assistant Examiner*—Wellington Chin
*Attorney, Agent, or Firm*—Thomas Stafford

[57] ABSTRACT

Unwanted distortion in signals being reconstructed from packets is substantially eliminated by employing a virtual sequence packet numbering scheme in conjunction with a time stamp value. A virtual sequence number which accompanies the packet identifies the location of the packet in an information spurt. If the packet is the initial packet in the information spurt, the time stamp value is used to "build out" the delay experienced by the packet to a fixed overall value. Subsequent packets in the information spurt are concatenated to the information spurt. A packet following one or more lost packets is also identified by the packet virual sequence number and is also treated as an initial packet.

27 Claims, 25 Drawing Sheets

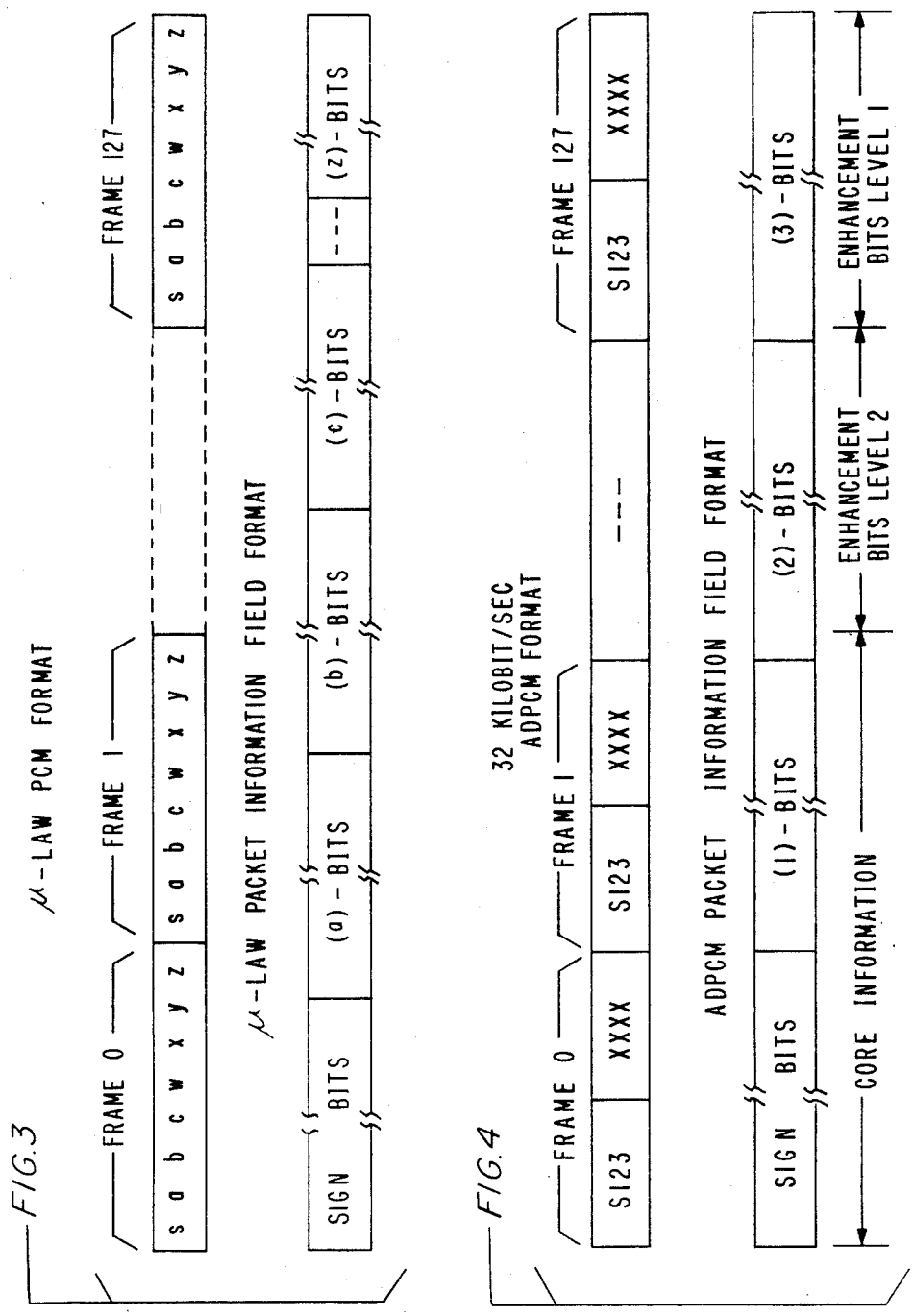

INPUT CONTROLLER 801

T1 = NO RESPONSE WAIT TIME
T2 = MAXIMUN PACKET SIZE WAIT TIME

OUTPUT CONTROLLER 803

TRANSMIT PROCESS MODULES 109
INPUT CONTROLLER 1102

TRANSMIT PROCESS MODULES 109
OUTPUT CONTROLLER 1106

SEQUENCE NUMBER PROCESSOR 1906

PACKET ORIGINATE TIME PROCESSOR 1907

RECEIVE PACKET BUS SEQUENCER 1910

RECEIVE ATS SEQUENCER 1911

$t_g$ — PACKET GENERATION TIME
$t_r$ — PACKET RECEIVE TIME
$t_p$ — PACKET PLAYOUT TIME
$t_o$ — PACKET ORIGINATE INTERNAL
BLD — BUILDOUT DELAY

TIME STAMP AND PACKET VIRTUAL SEQUENCE NUMBERING FOR RECONSTRUCTING INFORMATION SIGNALS FROM PACKETS

RELATED APPLICATIONS

United States patent applications Ser. No. 834,904, Ser. No. 834,965, Ser. No. 834,617, Ser. No. 834,615 and Ser. No. 834,910, were filed concurrently herewith.

TECHNICAL FIELD

This relates to packet transmission systems and, more particularly, to the reformatting of digital samples from packets.

BACKGROUND OF THE INVENTION

Information sources supply signals which are typically bursty in nature. That is, the data signals supplied to a packet transmission system have periods of activity and inactivity. It is also known that the individual packets in a particular transmission channel may experience random delay between a transmitter and corresponding receiver. The bursty nature of the signals and the random delays experienced by the packets cause distortion in the signals being reconstructed in a receiver. This distortion is manifested by unwanted gaps in the data signal. Additionally, valid gaps may be eliminated. Such distortion is extremely undesirable because of the resulting erroneous signals.

One attempt at eliminating the distortion resulting from the transmission of packets is to use a so-called time stamp value only. A time stamp is a measure of the random delay experienced by the particular packet during transmission. One such time stamp arrangement is disclosed in U.S. Pat. No. 4,506,358 issued to W. A. Montgomery on Mar. 19, 1985. It was suggested that the time stamp could be used to build out the transmission delay to a overall value for each received packet. Use of the time stamp value alone reduces but does not eliminate the randomness of the delay experienced by the packets. Therefore, undesirable gaps still appear in the data signal which cause distortion in the reconstructed information signal. Again, such distortion is undesirable.

SUMMARY OF THE INVENTION

The distortion resulting in signals being reconstructed from packets because of the bursty nature of the data signals and the random delays experienced by the packets in transmission in substantially eliminated, in accordance with an aspect of the invention, by employing a time stamp in conjunction with a so-called virtual sequence numbering arrangement so that each packet has the same fixed overall delay. This is realized by employing the virtual sequence number to identify the first packet in an information spurt and, then, to use the time stamp value to adjust the delay to the desired fixed overall value for the initial packet. Additional packets in the information spurt are then concatenated to the initial packet.

More specifically, each packet includes a time stamp field that contains a value representative of the random delay experienced by it in transmission and a sequence number field that contains a value which identifies the position of the packet in an information spurt. If the packet is the first packet in the information spurt, the sequence number field contains a distinct number different from any of the virtual sequence numbers. If the packet is not the first packet in the information spurt, the sequence number field contains theeh virtual sequence number.

If a received packet includes the distinct number identifying it as the first packet in an information spurt, the time stamp random delay value is advantageously employed to adjust the delay in the receiver prior to reformatting the digital samples from the packet information field so that a fixed overall delay is obtained. The subsequent packets in the information spurt are concatenated with the first packet and the time stamp value is not used. The packet generation interval for packets in an information spurt is a known fixed design parameter. Thus, since the subsequent packets in an information spurt are concatenated to the initial packet, they also experience the desired fixed overall delay.

The virtual sequence number indicates those packets in the sequence that are not an initial packet. The virtual sequence is a finite repeating sequence of numbers which does not include the distinct number reserved to identify the first packet in an information spurt. The number in the virtual sequence is incremented for each packet being generated including the first packet in the information spurt. If indeed, the packet is the initial packet in the information spurt, the sequence number field in the packet header is over-written with the unique distinct identifying number indicating it as the initial packet.

In accordance with another aspect of the invention, the virtual sequence number is alos advantageously employed to determine if one or more packets in the sequence have been lsot. If one or more packets have been lost, the next received packet is considered to be an initial packet and the time stamp value is again used to adjust the delay in the receiver to the fixed overall value.

BRIEF DESCRIPTION OF THE DRAWING

The invention will be more fully understood from the following detailed description of an illustrative embodiment taken in connection with the appended figures in which:

FIG. 3 illustrates a μ-law PCM signal format and a corresponding packet information field format useful in describing the invention;

FIG. 4 illustrates a 32-kilobit/s ADPCM signal format and a corresponding packet information field format in accordance with an aspect of the invention;

DETAILED DESCRIPTION

General Description

Figure 1:
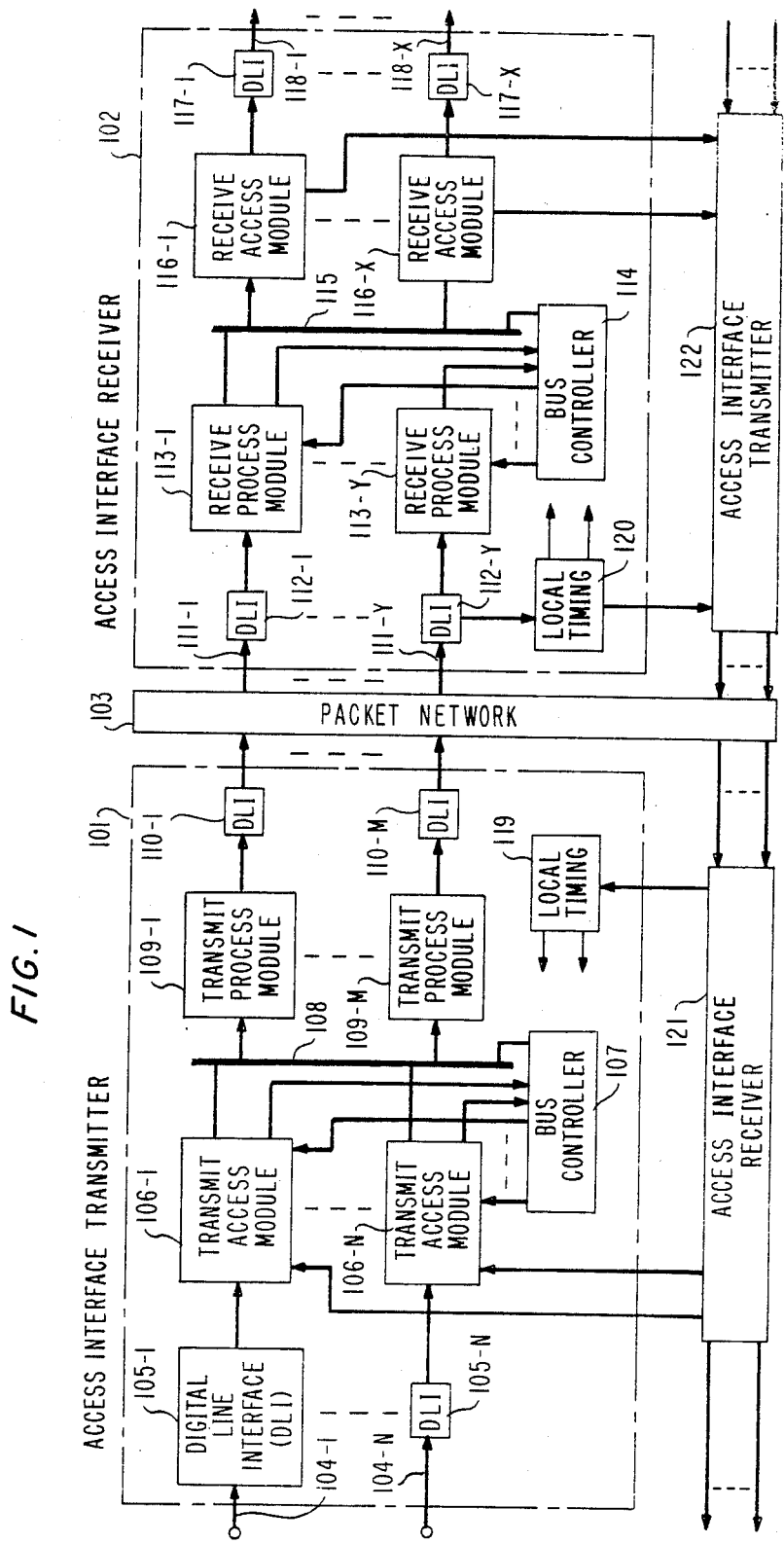
FIG. 1 shows a packet network including access interface transmitters and receivers including an embodiment of the invention.

FIG. 1 shows in simlified block diagram form an interface for accessing a packet network from a plurality of digital lines. The signals on the digital lines may include voice, digital data, voiceband data and the like, i.e., any of the signals transmitted, in this example, in the DS1 format. Accordingly, shown are access interface transmitter 101 and access interface receiver 102 which interface with packet network 103. It will be apparent to those skilled in the art that in practice an access interface receiver 121, essentially identical to receiver 102, is associated or otherwise co-located with each access interface transmitter 101 and an access interface transmitter 122, essentially identical to transmitter 101, is associated or otherwise co-located with each access interface receiver 102. Although only an end-to-end arrangement is shown, it will be apparent that a packet network may include numerous nodes through which packets will be transmitted and/or switched prior to being received at a particular access interface receiver.

Access interface transmitter 101 receives on transmission lines 104-1 through 104-N digital signals in, for example, a standard DS1 format including voice, voiceband data and the like and converts those signals into packets for transmission. A plurality of time division multiplexed signals are supplied by input terminals 104-1 through 104-N to digital line interface units (DLI) 105-1 through 105-N in access interface transmitter 101. The digital line interface units 105 are each of a type well known in the art for interfacing DS1 digital signals. Such digital line interface units include a phase locked loop for recovering the DS1 clock signal of 1.544 Mb/sec, a bipolar-to-unipolar converter, an equalizer for the equalization of gain and/or delay distortion, performance monitoring apparatus, provision for DS1 loopback maintenance and apparatus for reformatting the unipolar digital signals from the 24 channel format into a 32 time slot PCM format having a first transmission rate, in this example, of 2.048 Mb/sec synchronous with the access interface internal timing. Although only 24 time slots are used to transmit data in this example, it will be apparent that all 32 time slots may be employed in other arrangements. The 32 time slot PCM output signals from DLIs 105-1 through 105-N are supplied to transmit access modules 106-1 through 106-N, respectively. Each of transmit access modules 106 converts the 32 time slot PCM signals at the first transmission rate from associated ones of DLIs 105-1 through 105-N into a packet format in a manner as will be described below. Bus controller 107 interacts with each of transmit access modules 106-1 through 106-N and transmit packet bus 108 to control supplying packet outputs from transmit access modules 106 to transmit packet bus 108. The packets supplied to transmit packet bus 108 from each of transmit access modules 106-1 through 106-N include an internal destination code that identifies one of the transmit process modules 109-1 through 109-M in which the particular packet is intended to be processed. Transmit packet bus 108 has a processing rate, in this example, of 8.192 Mb/s. It should be noted that the number M of transmit process modules 109 may be more or less than the number N of transmit access modules 106.

Each transmit process module (109-1 through 109-M) monitors transmit packet bus 108 to detect and obtain individual packets assigned to it. Each of transmit process modules 109 further processes its assigned packets to complete the packet header field and to provide buffering to realize a uniform output rate. Details of transmit process modules 109 are further described below. The packet outputs from transmit process modules 109-1 through 109-M are supplied to digital line interface (DLI) units 110-1 through 110-M, respectively. The DLI units 110-1 through 110-M each converts the packetized information into a digital output signal format. In this example, the digital output signal comprises the known extended PCM framing format wherein each frame includes 193 bits and is transmitted at the 1.544 Mb/s rate. Such line interface units are known in the art. The packetized DS1 formatted signals, including the packets of information, are supplied from DLI units 110-1 through 110-M to packet network 103. Packet network 103 may be any of those known in the art. See, for example, U.S. Pat. No. 4,494,230, issued Jan. 15, 1985 to J. S. Turner, for one example of a preferred packet switching network. The packetized DS1 signals are transmitted as desired to any number of remote access interface receiver units 102. Timing signals for the access interface transmitter 101 are derived from a corresponding access interface receiver 121 co-located with the transmitter 101 for use in well-known fashion as desired. Local timing unit 119 generates the local timing signals used in operating the modules in transmitter 101. The clock signal from which the local timing signals are derived is obtained from co-located access interface receiver 121 and will be described in relationship to access interface receiver 102.

Access interface receiver 102 receives on transmission lines 111-1 through 111-Y packetized digital signals in a DS1 extended framing format from packet network 103 and converts those packetized digital signals to the standard DS1 format including voice, voiceband data and the like. It is again noted that a particular access interface receiver 102 may receive packets from one or more access interface transmitters 101 and the number Y of receive transmission lines may vary from receiver to receiver. To this end, the packetized signals are supplied via DS1 level transmission lines 111-1 through 111-Y to digital line interface (DLI) units 112-1 through 112-Y, respectively. Digital line interface units 112 are again of a type well known in the art which convert the bipolar DS1 packetized signals into unipolar digital signals, reformats the unipolar digital signals into a 32 time slot unipolar format having a transmission rate, in this example, of 2.048 Mb/sec, and recovers the DS1 clock signal, etc. The recovered clock signal is employed in well-known fashion to generate the so-called local timing signals in local timing unit 120 that are used in access interface receiver 102 and in a co-located access interface transmitter 122. Access interface transmitter 122 is essentially identical to access interface transmitter 101. The 32 time slot unipolar packetized signals are supplied from each of DLIs 112-1 through 112-Y to receive process modules 113-1 through 113-Y, respectively. Each of receive process modules 113-1 through 113-Y converts the incoming b 32 time slot packetized signals from a first transmission rate into an internal processing rate employed by receive packet bus 115. In this example, the first transmission rate is the 2.048 Mb/sec 32 time slot format rate and the internal receive packet bus 115 rate is 8.192 Mb/sec. Receive process modules 113 also pre-process the received packets. For example, the pre-processing includes adding an internal receive destination code field, processing time stamp information, monitoring for transmission errors and dropping any packets which have incurred such errors in their headers. Bus controller 114 interacts with each of receive process modules 113-1 through 113-Y and receive packet bus 115 to control the flow of packets onto receive packet bus 115. Receive access modules 116-1 through 116-X each monitors activity on receive packet bus 115 to detect packets assigned to it via the receive destination code in the packet header. Receive access modules 116-1 through 116-X reconstruct a facsimile of the original signals applied to transmit access modules 106-1 through 106-N from one or more remote access interface transmitters 101. Outputs from each of receive access modules 116-1 through 116-X are 32 time slot time division multiplexed signals which are supplied to digital line interface units 117-1 through 117-X. Each of digital line interface units 117-1 through 117-X converts a unipolar 32 time slot time division multiplexed signal having a rate of 2.048 Mb/sec into a standard DS1 PCM format having a rate of 1.544 Mb/sec for transmission as desired over associated digital transmission lines 118-1 through 118-X, respectively. It is noted that the number Y of receive process modules 113 may be more or less than the number X of receive access modules 116.

For simplicity and clarity of description, the following description of the modules of the transmitter 101 and receiver 102 is on a per time slot basis. It will be apparent to those skilled in the art that the modules are time-shared to process the 32 time slots of the internal signals.

Transmit Access Module

Figure 2:
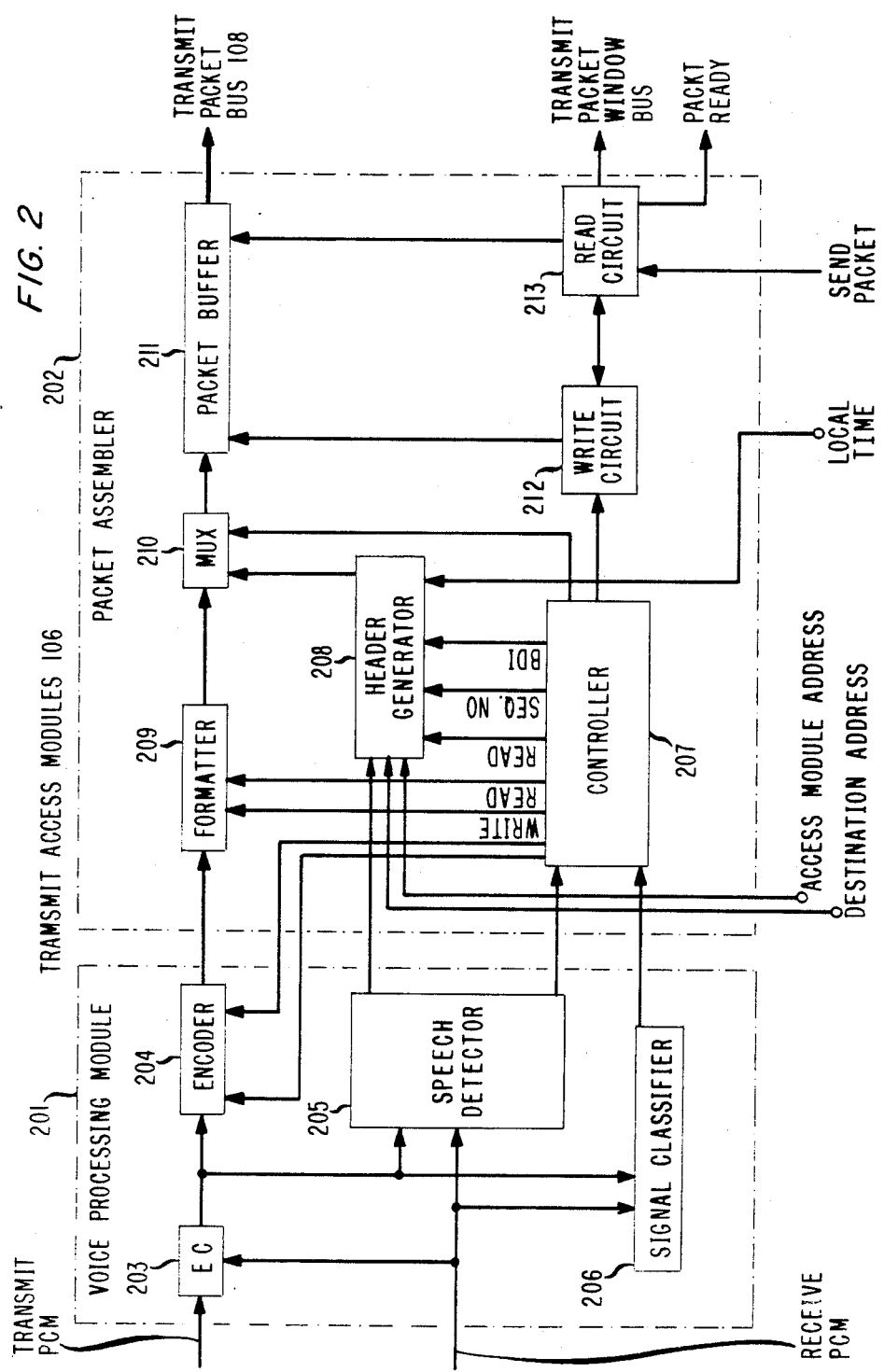
FIG. 2 depicts details of transmit access modules 106 employed in the access interface transmitter 101 of FIG. 1.

FIG. 2 shows in simplified block diagram form details of transmit access modules 106. Each of transmit access modules 106 includes a voice processing module 201 and a packet assembler 202. Voice processing module 201 includes echo canceler 203, encoder 204, speech detector 205 and signal classifier 206. voice processing module 201 is employed to encode voiceband signals on a time slot by time slot basis including speech and voiceband data into an ADPCM encoded output signal which is supplied to packet assembler 202. During time slots which are assigned to digital data signals, voice processing module 201 becomes transparent and those signals are supplied directly to packet assembler 202 without any voice signal processing in a well known manner (not shown). In processing the voice band signals, echo canceler 203 is supplied with the 32 time slot transmit PCM signal from an associated one of digital line interfaces 105 (FIG. 1) and with a receive PCM signal from co-located access interface receiver 121 (FIG. 1) to cancel echos in well-known fashion. The receive PCM signal is specifically obtained from an associated one of receive access modules in the co-located access interface receiver 121. Such echo canceler units are well known in the art. See, for example, U.S. Pat. No. 3,500,000, and an article entitled "A Single-Chip VLSI Echo Canceler", by D. L. Duttweiler et al, BSTJ, Vol. 59, No. 2, February 1980, pages 149–160.

Speech detector 205 is supplied with the output from echo canceler 203 and the receive PCM signal from the associated access interface receiver 121 (FIG. 1). Speech detector 205 detects the presence of voiceband energy in each time slot of the 32 time slots of the transmit PCM signals supplied to it. Speech detector 205 generates an active- inactive output for each of the time slots of the transmit PCM signal which is supplied to controller 207 and a noise estimate value which is supplied to header generator 208 in packet assembler 202. Such speech detector arrangements are known in the art. See, for example, U.S. Pat. No. 4,277,645, issued to C. J. May, Jr., on July 7, 1981.

Signal classifier 206 is also supplied with the output signal from echo canceler 203 and the receive PCM signal from the associated access interface receiver and classifies the signals in the transmit PCM time slots as being voice or nonvoice signals. The voice-nonvoice output indication from signal classifier 206 is supplied on a per time slot basis to controller 207 in packet assembler 202. Such signal classifier arrangements are also well known in the art. See, for example, U.S. Pat. No. 4,281,218, issued to Chin-Sheng Chuang et al on July 28, 1981.

Figure 25:
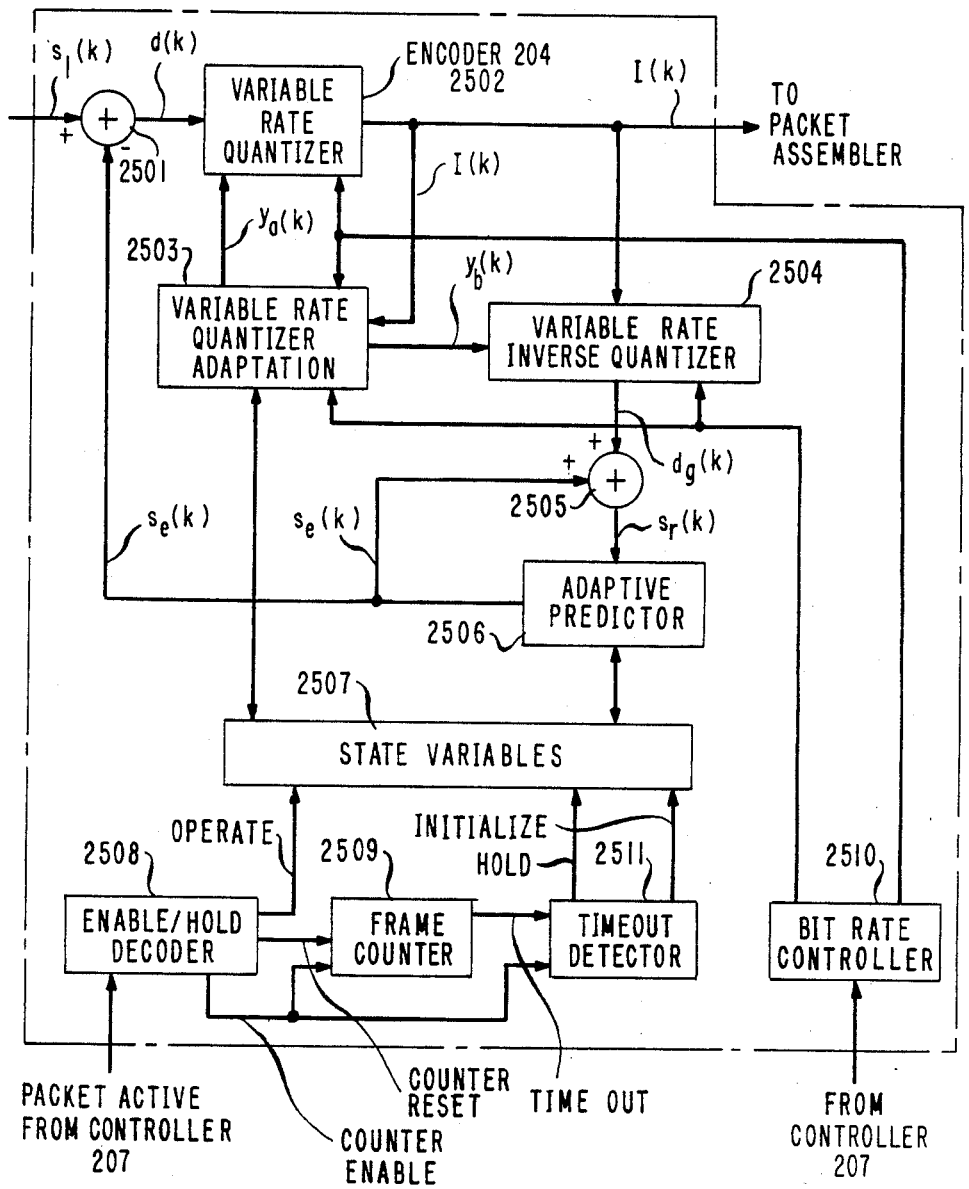
FIG. 25 shows in simplified block diagram form details of encoder 204 used in transmit access modules 106 of FIG. 2.

Encoder 204 is a variable rate encoder for converting the transmit PCM signals into ADPCM output signals. Controller 207 supplies a packet active control signal, and an encoding rate and type of coding control signal to encoder 204. The encoding rate may be one of a plurality of rates selected as desired depending on the network configuration for the particular time slot in the PCM signal and upon the signal classifier output. The packet active control signal is useful to facilitate for handling late-arriving packets and for recovering from packet loss and transmission errors in an associated remote access interface receiver in accordance with an aspect of the invention. In encoder 204 the packet active signal is employed to control initialization, adaptation and holding of its state variables. Details of encoder 204 are shown in FIG. 25 and described below in conjunction with the state diagram of FIG. 26.

The ADPCM output from encoder 204 is supplied to formatter 209 in packet assembler 202. Formatter 209 includes, in this example, a RAM memory unit and a plurality of counters (not shown) which perform a shift register function for the purpose of rearranging the supplied bits into a packet information field format as shown in FIGS. 3 and 4 for the $\mu$-law PCM signal format and for the 32 kilobit/sec ADPCM signal format, respectively. It should be noted that FIGS. 3 and 4 depict the formats for an individual time slot, for example, time slot zero, and are repeated for the remaining time slots 1 through 31 in each frame of the PCM transmit signals. Specifically, formatter 209 performs the function of grouping in a prescribed manner the individual bits of each time slot into the packet information field for that time slot, in accordance with an aspect of the invention. The grouping of the bits is such as to facilitate processing of the packet information field, in accordance with an aspect of the invention. It is noted that the grouping of the bits is readily realized by an addressing scheme of the RAM memory unit memory locations. For example, the bits of the $\mu$-law PCM or the ADPCM samples can be written into the RAM memory locations in parallel for a predetermined number of repetitive frames and then the "groups" of bits are formed from the predetermined number of frames by reading them out in series beginning with the group of most significant bits to the group including the least significant bits of the samples from the predetermined number of frames. Thus, as shown in FIG. 3, for $\mu$-law PCM signals there are eight bits per time slot and 128 frames are included in a packet interval. In this example, a packet interval is 16 milliseconds. Then, the sign(s) bits for a particular time slot from the 128 frames are grouped together in 128 bit positions in the RAM memory of formatter 209. The (a) bits from the 128 frames for the particular time slot are grouped together, also in 128 bit positions of the RAM memory, and so on through the (z) bits. The groups of bits from the 128 frames for the time slot form the packet information field which is outputted to multiplexer 210.

For the 32 kbit/sec ADPCM format, the time slot includes four bits, namely, s, 1, 2 and 3, and four so-called don't are bits denoted by the character x. Thus, the 128 sign bits are grouped together in bit positions of the RAM memory in formatter 209. The 128 (1)-bits are also grouped together in bit positions of the RAM memory as are the 128 (2)-bits and 128 (3)-bits. As indicated in FIG. 4, the (3)-bits are considered enhancement bits level 1, and the (2)-bits are the enhancement bits level 2. These level 1 and level 2 enhancement bits are the groups of bits which are controllably droppable, that is, they can be removed from voice packets as desired, in accordance with an aspect of the invention, as will be explained later. In addition to the 4-bit ADPCM sample, the system configuration may call for a 3-bit ADPCM sample transmission or a 2-bit ADPCM sample transmission in a particular time slot. For 3-bit ADPCM, only the s, 1 and 2 bits are used and for 2-bit ADPCM, only the s and 1 bits are used. It is noted that this packet information field is formed for each of the 32 time slots in the incoming signal. That is to say, a packet information field is formed for each of the time slots and, hence, for each of the channels being transmitted. The writing-in of data to and the reading-out of the packet information fields from formatter 209 is controlled by controller 207 as explained below. The packet information field output from formatter 209 is supplied to multiplexer 210 where it is combined with an appropriate packet header from header generator 208.

Figure 5:
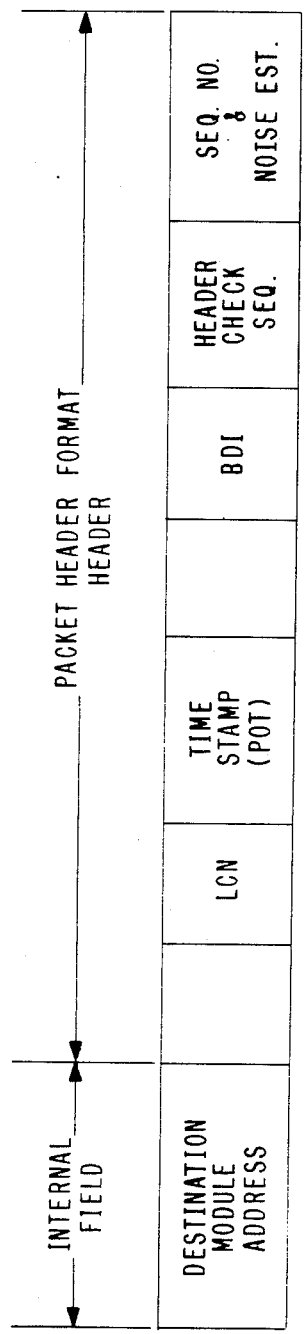
FIG. 5 depicts a packet header format useful in describing the invention.

Header generator 208 is operative to generate the packet header as shown in FIG. 5 on a per-packet basis under control of controller 207. Header generator 208 includes memory for storing the desired header fields. The packet header fields include an internal field which has an internal destination code that identifies the one of transmit process modules 109 (FIG. 1) that will process the packet for transmission to a remote access interface receiver. The internal destination module code is discarded in the transmit process module prior to transmission. Another field is the logical channel number (LCN) which identifies where in the transmission system the packet is to be transmitted. The time stamp field includes the local time at which the packet was originated, namely, the packet originate time (POT), and is obtained from a local time signal from local timing unit 119 (FIG. 1). In this example, the local time rate is 1 kHz. The BDI field includes information that is used to select the type of processing for the packet and is used to indicate the type of packet that has been generated. It is again noted that for digital data and voice band data none of the bits are droppable. In the access interface transmitter 101, the BDI for the particular time slot is obtained from the particular system configuration stored in controller 207. The BDI field includes two subfields, one contains the type of coding which is being used for the particular packet (receive status) and the other contains information concerning previous processing of the packet, e.g., whether any of the enhancement fields have been dropped (packet length value). The sequence number (SEQ.No.) field includes the initial packet identifier, if the packet happens to be the first packet occurring after a period of silence, or the packet virtual sequence number if it is a subsequent one of consecutive packets. The use of the virtual sequence number scheme is described below. The noise estimate field includes the background noise estimate value generated by speech detector 205. A check sequence is calculated over the entire packet header for insertion into a header check sequence field. These header field signals are loaded into the header generator 208 under control of controller 207. The header is supplied to multiplexer 210 where it is combined with the packet information field and, subsequently, written into packet buffer 211. The writing into packet buffer 211 is also under control of controller 207 in conjunction with write circuit 212. The packets in packet buffer 211 are read out to transmit packet bus 108 (FIG. 1) under control of read circuit 213 and bus controller 107 (FIG. 1). Read circuit 213 sends a packet ready signal to bus controller 107 and when bus controller 107 transmits a send packet signal, read circuit 213 causes the packet to be read from packet buffer 211 to transmit packet bus 108. Operation of bus controller 107 is described below.

Controller 207 controls the operation of encoder 204 and packet assembler 202. To this end, controller 207 includes control logic and a plurality of packet interval timers, one for each time slot (not shown) for effecting a sequence of control steps in generating a packet in assembler 202 and for controlling the encoder 204. Again, in this example, the packet interval is 16 milliseconds.

Figure 6:
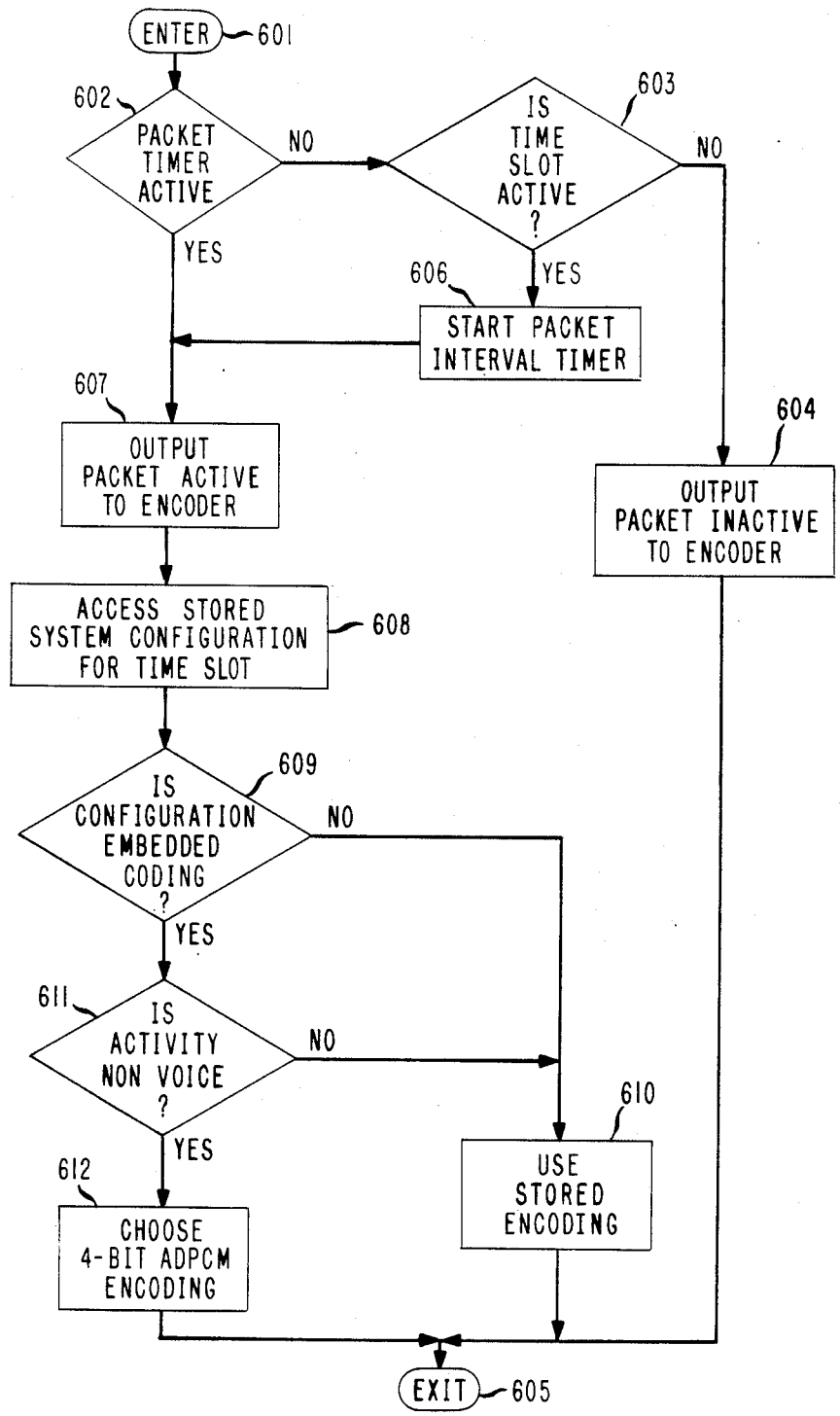
FIG. 6 is a flow chart illustrating a sequence of operations effected in controller 207 in controlling encoder 204 of FIG. 2.

FIG. 6 is a flow chart showing a sequence of steps which are effected in controller 207 in controlling the configuration and operation of encoder 204 (FIG. 2). Accordingly, the sequence is entered for each time slot of a recurring frame via 601. Thereafter, conditional branch point 602 tests to determine whether a packet is active according to the output from speech detector 205. If the test result in step 602 is NO, conditional branch point 603 tests to determine if the present time slot is active. The activity is sensed by interrogating the state of the output from speech detector 205. If the test result in step 603 is NO, operational block 604 causes controller 207 to output a packet inactive (false) signal which is supplied to encoder 204 (FIG. 2) and the encoder control sequence is exited via 605. That is to say, encoder 204 is disabled during time slot intervals that both the packet and time slot are determined to be inactive. If the test result in step 603 is YES, the time slot is active and operational block 606 causes a packet interval timer (not shown) in controller 207 to start counting the packet interval. This indicates the beginning of a packet since the packet indication in step 602 was inactive and now the time slot as indicated in step 603 is active. Consequently, this is the first time slot in a packet. Thereafter, control is transferred to operational block 607 which causes controller 207 to output a packet active (true) signal. The packet active signal is supplied from controller 207 to enable encoder 204 (FIG. 2). Returning to step 602, if the test result is YES, the packet remains active and operational block 607 causes the packet active signal to be supplied from controller 207 to encoder 204. Operational block 608 causes the stored system configuration, i.e., the type of coding, for the present time slot to be accessed. Conditional branch point 608 tests the system configuration for the present time slot to determine if the encoding is so-called embedded coding. The embedded coding scheme is known in the art. See, for example, U.S. Pat. No. 3,781,685 issued Dec. 25, 1973, and an article by David J. Goodman entitled "Embedded DPCM for Variable Bit Rate Transmission", IEEE *Transactions On Communications*, Vol. Com-28, No. 7, July 1980, pages 1040–1046. If the test result in step 609 is NO, the type of coding is not embedded and operational block 610 causes the encoding stored in the system configuration in controller 207 to be employed, i.e., for example, bypass encoder 204 if digital data is being transmitted, 4-bit ADPCM, 3-bit ADPCM or 2-bit ADPCM coding. Thereafter, the sequence is exited via 605. If the test result in step 608 is YES, the coding is embedded and conditional branch point 611 tests to determine whether the transmission activity is nonvoice. If the test result in step 611 is NO, i.e., the activity is voice, and operational block 610 causes the stored encoder configuration to be used and the sequence is thereafter exited via 605. If the test result in step 611 is YES, the activity is nonvoice, i.e., for example, voiceband data, and operating block 612 causes a premium transmission qualtiy to be provided to this channel, i.e., time slot. In this example, 4-bit ADPCM encoding to be used. Thereafter, the sequence is exited via 605. The stored encoder configurations are, for example, 4-bit, 3-bit or 2-bit embedded coding ADPCM, and 4-bit, 3-bit or 2-bit non-embedded coding ADPCM. In for example a 4/2-bit embedded coding arrangement two of the four bits are socalled core bits and cannot be dropped, only the two least significant bits can be dropped. Similarly, in a 4/3 embedded coding arrangement, three of the bits are core bits and only the least significant bit can be dropped.

Figure 7:
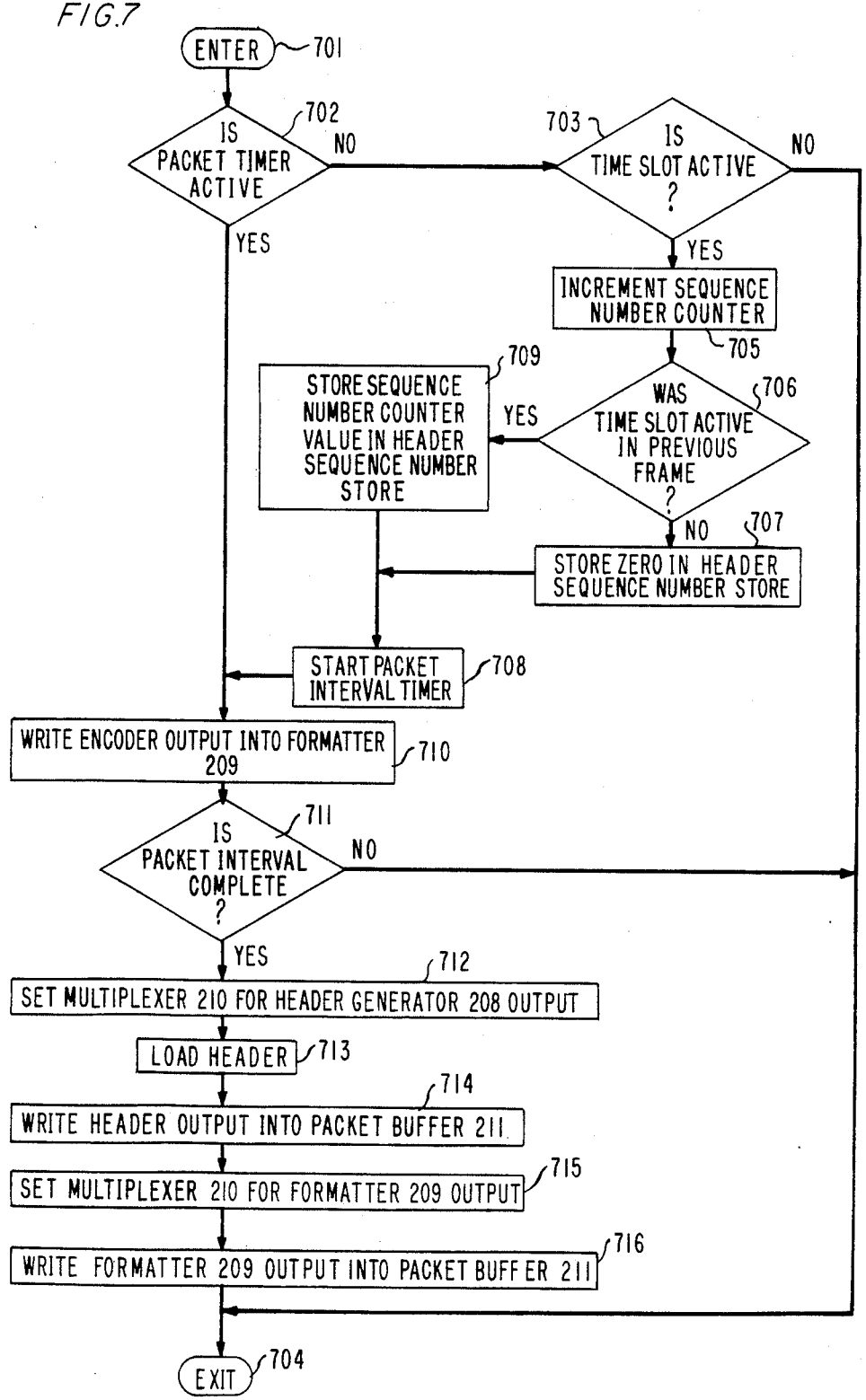
FIG. 7 is a flow chart illustrating another sequence of operations effected in controller 207 in controlling packet assembler 202 of FIG. 2.

FIG. 7 is a flow chart of a sequence of operations effected by controller 207 in controlling packet assembler 202 (FIG. 2) to generate a packet which is to be supplied to transmit packet bus 108 (FIG. 1) in access interface transmitter 101. Accordingly, the sequence is entered for each time slot of a recurring frame via 701. Thereafter, conditional branch point 702 tests to determine whether the packet is active. If the test result of step 702 is NO, conditional branch point 703 tests to determine whether the time slot is active. If the test result in step 703 is NO, the sequence is exited via 704. That is to say, there is no packet to be presently generated for this particular time slot. If the test result of step 703 is YES, operational block 705 causes a packet sequence number counter to be incremented. This is done because step 702 yielding a NO test result and step 703 yielding a YES test result indicate the start of a new packet. It should be noted that the sequence number counter, in this example, is a modulo 15 counter, i.e., it counts 1–15 continuously. There is no zero state. The zero (0) state is used instead of a flag for identifying the initial packet in a spurt of contiguous packets. A particular packet sequence may be, for example, 0, 5, 6, 7, 8, ..., 15, 1, 2, 3, 4, 5, ... Another sequence may be 0, 14, 15, 1, 2, ..., 12, 13, 14, 15, 1, ... Such sequences are known as virtual sequences. The zero is inserted to indicate the initial or scheduled packet in a speech or information spurt. It is noted that the number in the virtual sequence is incremented for each packet in the information spurt including the first packet. Thus, the unique number identifying the initial packet in the information spurt replaces a number in the virtual sequence, a shown above. The virtual sequence numbering of the packets in an information spurt simplifies, in accordance with an aspect of the invention, the reconstruction of the digital signals in an associated remote access interface receiver 102. Conditional branch point 706 tests to determine whether this particular time slot was active in the last previous frame. If the test result in step 706 is NO, operational block 707 causes a zero (0) to be stored in the header generator 208 (FIG. 2) sequence number store. This indicates the start of a new sequence of packets in the information spurt. Thereafter, operational block 708 causes the packet interval timer to being timing the packet interval. It should be noted that this packet interval timer is synchronous with the packet interval timer of step 606 of FIG. 6. Returning to step 706, if the test result is YES, the packet is another in the current information spurt and operational block 709 causes the current sequence number counter value to be stored in the sequence number store in header generator 208 (FIG. 2). Thereafter, operational block 708 causes the packet interval timer to start timing the packet interval. Then, operational block 710 causes the output sample from encoder 204 (FIG. 2) for the current time slot to be written into formatter 209.

Returning to step 702, if the test result is YES, the current packet is still active and operational block 710 causes the output sample from encoder 204 (FIG. 2) for the current time slot to be written into formatter 209 (FIG. 2).

Conditional branch point 711 test to determine if the current packet interval is complete. Again, in this example, the packet interval is 16 milliseconds. If the test result of step 711 is NO, the packet information field is not yet completed and the sequence is exited via 704. If the test result in step 711 is YES, the packet is complete and ready to be assembled. Operational block 712 causes the multiplexer 210 (FIG. 2) to be set for the header output from header generator 208 (FIG. 2). Operational block 713 causes the header information to be loaded into the stores in header generator 208. That is to say, the internal destination field, the noise estimate, the BDI, the sequence number (SEQ.No.), the logical channel number (LCN) and the time stamp (TS) fields are loaded into the header stores in header generator 208 (FIG. 2). The packet originate time (POT) is inserted into the TS field. It is noted that POT=LTA−TS. That is, the POT is the packet arrival time LTA, i.e., the local time at which the packet arrives at a node, less the TS value in the time stamp field of the arriving packet. If the packet is being originated at this node, i.e., access interface transmitter, then TS=0. It is important to note that the same local time signal is used in all modules in a node. This use of the same local time signal in conjunction with using the packet arrival time LTA at and packet departure time LTD from a node to compute the time stamp value simplifies the time stamp computation and allows use of only one time stamp field in the packet header, in accordance with an aspect of the invention. Operational block 714 causes the header fields (FIG. 5) to be written via multiplexer 210 into packet buffer 211 (FIG. 2). Operational block 715 causes multiplexer 210 to be set for the formatter 209 output. This output is the packet information field which follows the packet header. Operational block 716 causes the packet information field from formatter 209 to be written via multiplexer 210 into packet buffer 211. Consequently, the completed packet is now stored in packet buffer 211. Thereafter, the sequence is exited via 704.

Bus Controller

Figure 8:
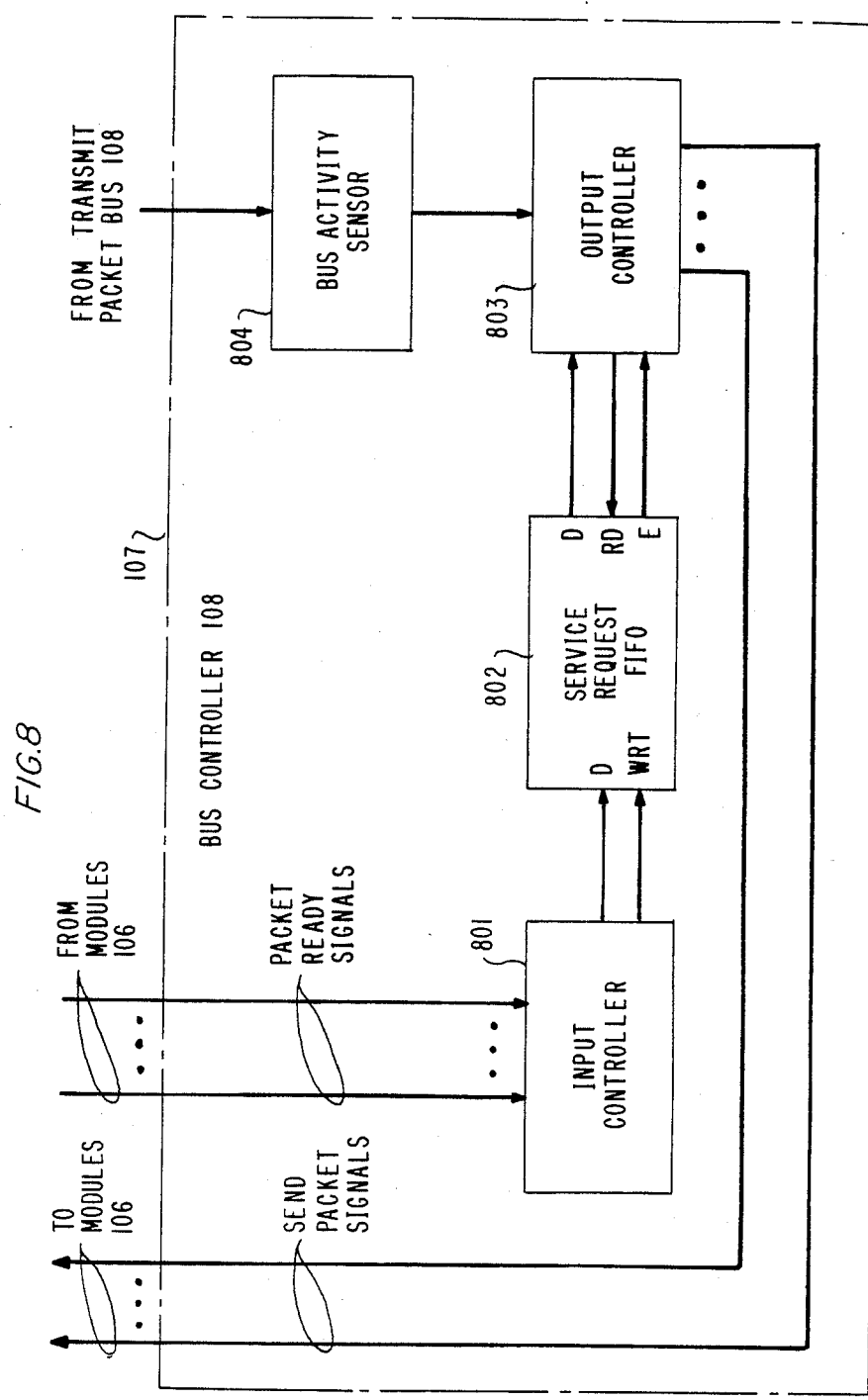
FIG. 8 shows in simplified block diagram form details of bus controller 107 of FIG. 1.

FIG. 8 shows in simplified block diagram form details of bus controller 107 of FIG. 1. It is noted that bus controller 107 employed in access interface transmitter 101 interfaces with each of transmit access modules 106-1 through 106-N and transmit packet bus 108. Bus controller 114 employed in access interface receiver 102 is essentially identical to bus controller 107. Bus controller 114 differs from bus controller 107 in that it is employed in access interface receiver 102 to interface with each of receive process modules 113-1 through 113-Y and receive packet bus 115. Accordingly, only bus controller 107 will be described in detail, since the operation of bus controller 114 will be apparent therefrom to those skilled in the art. The bus controller 107 includes input controller 801, service request FIFO 802, i.e., a first in-first out type of buffer storage unit, output controller 803 and bus activity sensor 804. Input controller 801 includes combinational logic for the polling of the packet ready requests from the transmit access modules 106-1 to 106-N and the conversion of these requests into the transmit access module address for storage in the service request FIFO 802.

Figure 9:
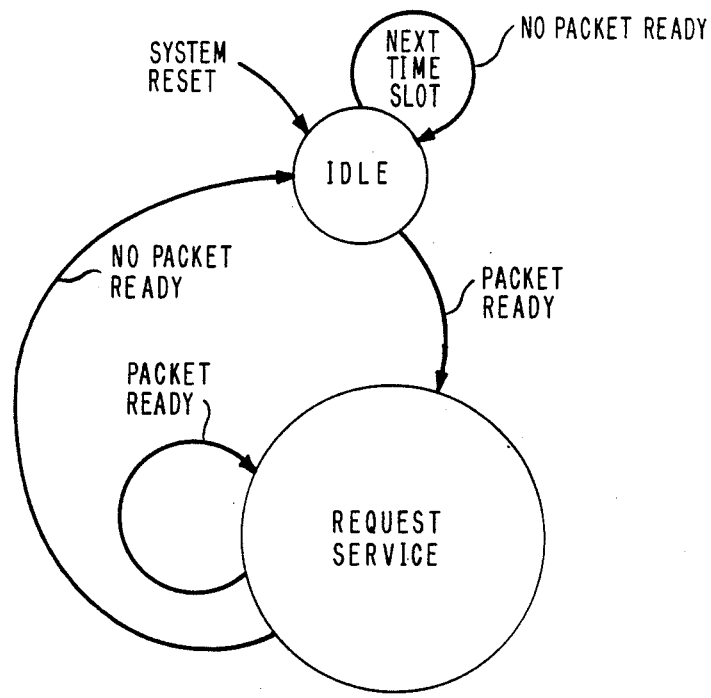
FIG. 9 depicts a state diagram illustrating operations effected in input controller 801 in bus controller 107 of FIG. 8.

FIG. 9 shows a detailed state diagram of the operation of input controller 801 (FIG. 8). The state diagram consists of two states, an IDLE state and a REQUEST SERVICE state, in which a service request is stored in service request FIFO 802. At system reset, the system enters the IDLE state and remains in the IDLE state until there is a packet ready request signal from one of transmit access modules 106 (FIG. 2). When the packet ready request signal is received from any of transmit access modules 106, control passes to the REQUEST SERVICE state, and the packet ready service request is stored in service request FIFO 802. When there is no longer a packet ready service request signal, input controller 801 returns to the IDLE state. However, if there is another packet waiting, indicated by a packet ready service request, bus controller 107 passes back into the REQUEST SERVICE state and stores the packet ready service request in service request FIFO 802.

Bus activity sensor 804 examines packet activity on transmit packet bus 108 primarily through what is called the packet window bus and determines whether transmit packet bus 108 is free to support another packet being outputted from one of transmit access modules 106. Bus activity sensor 804 controls the operation of output controller 803 in conjunction with the empty (E) signal supplied by service request FIFO 802. That is, when there is no activity on transmit packet bus 108, output controller 803 is enabled to release another send packet message to one of transmit access modules 106, if indeed there is a request queued in service request FIFO 802. When there is activity on transmit packet bus 108, output controller 803 is disabled until that activity ceases. Output controller 803 contains combinational and sequential logic (not shown) for first accessing service request FIFO 802 and converting the transmit access module number which was stored there into the correct send packet signal which will be transmitted to one of the transmit access modules 106.

Figure 10:
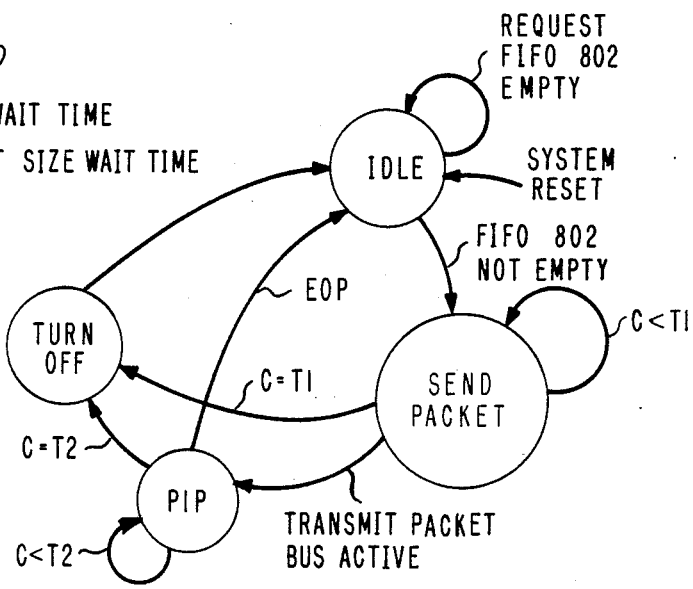
FIG. 10 shows a state diagram illustrating operations effected in output controller 803 in bus controller 107 of FIG. 8.

FIG. 10 shows a detailed state diagram illustrating the operation of output controller 803 of bus controller 107. Upon system reset, output controller 803 goes into an IDLE state and it remains in the IDLE state as long as service request FIFO 802 remains empty. When a service request is stored in service request FIFO 802, control passes to the SEND PACKET state. In the SEND PACKET state, output controller 803 reads the service request from FIFO 802 and formats the correct send packet signal for transmission to the appropriate one of transmit access modules 106. At this time, output controller 803 starts an interval counter called "C" which measures the packet activity interval of transmit packet bus 108. As long as the measured interval of counter C is less than some predetermined time interval T1, controller 803 waits for the corresponding packet to appear on transmit packet bus 108. If no packet appears when the counter time interval C is equal to T1, output controller 803 passes to the TURN-OFF state and the send packet signal is relinquished to the particular one of transmit access modules 106. Once the send packet signal is relinquished, output controller 803 returns to the IDLE state and waits for another service request to be stored in FIFO 802. Thereafter, the new packet ready service request is processed as described above. If, however, transmit packet bus 108 becomes active, output controller 803 passes from the SEND PACKET state to the PACKET IN PROGRESS (PIP) state. As long as a packet is on transmit packet bus 108, output controller 803 remains in the PIP state. In the PIP state, output controller 803 continues to monitor the counter C count to determine if it is less than some other larger predetermined interval, T2. If for some reason the count in counter C becomes equal to interval T2, the output controller 803 passes to the TURN-OFF state and relinquishes the send packet signal to the particular one of transmit access modules 106. If the counter C never reaches a count equal to interval T2, but the end of a packet is detected, as evidenced by transmit packet bus 108 becoming idle once again, output controller 803 will return to the IDLE state, waiting for the next service request, i.e., packet ready signal, to be received from one of transmit access modules 106. As part of the end of packet transition from the PACKET IN PROGRESS state to the IDLE state, the send packet signal is relinquished to the particular one of transmit access modules 106 being serviced.

Transmit Process Module

Figure 11:
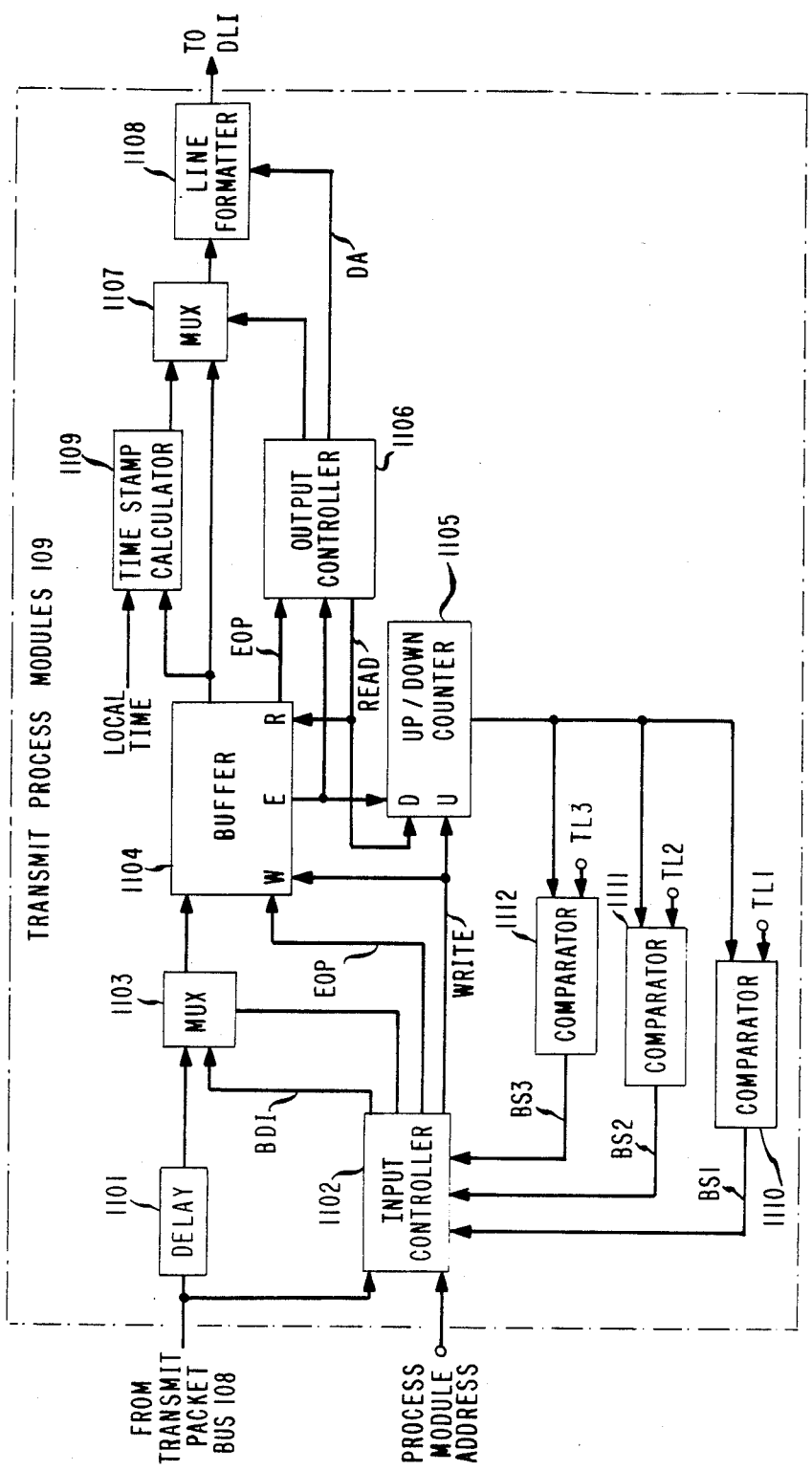
FIG. 11 depicts in simplified block diagram form details of transmit process modules 109 of access interface transmitter 101 of FIG. 1.

FIG. 11 shows in simplified block diagram form details of transmit process modules 109 employed in access interface transmitter 101 of FIG. 1. Each transmit process module 109 monitors transmit packet bus 108 for packets, checking the destination addresses as they appear on transmit packet bus 108. When a particular one of transmit process modules 109 detects its own address in the destination field of a packet header, the packet is supplied to delay 1101. Delay 1101 allows input controller 1102 to process the packet as it is received. To this end, the packet is also supplied to input controller 1102, which controls the entire packet input process of transmit process module 109. That is, input controller 1102 monitors transmit packet bus 108 and applies appropriate controls to multiplexer 1103, buffer 1104 and up/down counter 1105. Buffer 1140 is a so-called FIFO type, i.e., first in-first out type of buffer storage unit. Buffer 1104 is linked also with an up/down counter 1105 which counts the number of bytes of packet data stored in buffer 1104. Output controller 1106 controls reading packets out of transmit process module 109. To this end, output controller 1106 controls the read cycle from buffer 1104, multiplexer 1107, line formatter 1108 and down-counting of up/down counter 1105. Off line from the packet data flow path, time stamp calculator 1109 performs the packet originate time (POT) to time stamp (TS) conversion. Up/down counter 1105 supplies its count, i.e., the number of bytes of packet data stored in buffer 1104, to a first input of each of comparators 1110, 1111, and 1112. Comparators 1110-1112 compare the amount of packet data stored in buffer 1104 with a set of three fixed predetermined thresholds, namely, thresholds TL1, TL2 and TL3. The comparisons of the amount of packet data stored in buffer 1104 to these thresholds determine whether or not packets being processed in transmit process module 109 will, if permissible, have one or more of the enhancement bit fields removed, in accordance with an aspect of the invention, on being inputted into buffer 1104. Comparators 1110, 1111 and 1112 generate buffer status signals BS1, BS2 and BS3, respectively. Buffer status signals BS1, BS2 or BS3 are generated when the count in counter 1105 is greater than the corresponding one of thresholds TL1, TL2 or TL3, respectively. Buffer status signals BS1, BS2 and BS3 are supplied to input controller 1102 in order to determine whether input packets should have the bits in one or more of the enhancement bit fields dropped. The algorithm for dropping bits is as follows: if the amount of packet data stored in buffer 1104, as measured by up/down counter 1105, is greater than the first predetermined fixed threshold TL1, the BS1 output from comparator 1110 is true, i.e., a logical 1, and the level 1 enhancement bit field will be dropped from the current packet being processed; thus shortening the packet size and slowing down the speed at which buffer 1104 fills with packet data, in accordance with an aspect of the invention. If the level 1 enhancement bit field has already been dropped or the packet type does not permit bit dropping, then no further action will be taken. If buffer 1104 continues to fill beyond the second predetermined fixed threshold TL2, comparator 1111 yields a true BS2 signal and both the level 1 and level 2 enhancement bit fields will be dropped from the current packet being processed. This will further shorten the size of the packets and further slow the rate at which buffer 1104 fills with packet data, in accordance with an aspect of the invention. Again if both the level 1 and level 2 enhancement bit fields have already been dropped or the packet is of a type that does not permit bit dropping, then no further action will be taken. If only the level 1 enhancement bit field had been dropped the level 2 enhancement bit fields would be dropped. It is noted that there is some maximum amount of data which the buffer 1104 can store. This maximum amount of data stored is indicated by the third predetermined fixed threshold TL3. Therefore, if the amount of data stored in buffer 1104 exceeds threshold T3, the current packet being processed is discarded in its entirety and no further packet data will be allowed into the buffer 1104 until some of the packets stored therein have been outputted. This prevents overflow of buffer 1104 and prevents a fraction of a packet from being inputted into buffer 1104. Only whole packets should be stored in buffer 1104. A fractional packet is defined as an arbitrary piece of the received input packet, possibly only a header.

Delay 1101 accepts packet data as its input as seen from the packet data bus 108. Its output is the same packet data delayed by a predetermined number of clock pulses. The data output from delay 1101 is applied to multiplexer 1103. Multiplexer 1103 is employed to insert a new bit-dropping indicator field (BDI) generated in input controller 1102 at the appropriate time in the header of the packet being processed. The new BDI field will indicate whether none, one or both of the enhancement bit fields have been dropped from the packet being processed. Multiplexer 1103 is controlled by input controller 1102 in order to insert the bit-dropping indicator field into the packet's header at the appropriate time. Multiplexer 1103 output is supplied to buffer 1104. Input controller 1102 also supplies an end of packet (EOP) signal to buffer EOP. This EOP signal is supplied into a separate storage element of the buffer 1104 associated with each byte of the packet data being processed in parallel. Normally, the EOP signal is a logical 0, i.e., a false signal. When the packet has reached its end, the EOP signal associated with the final byte of packet data is set to a logical 1, i.e., a true signal. The write signal is used to control buffer 1104 in order to drop the level 1, level 2 or both of the enhancement bit fields as desired, under control of inut controller 1102. The write signal causes the data appearing at the output of multiplexer 1103, as well as the EOP signal, to be stored in buffer 1104 in parallel. When buffer 1104 is empty, it generates an empty (E) indication signal which is supplied to up/down counter 1105 and to output controller 1106. This empty (E) indication signal causes up/down counter 1105 to be reset to its initial condition. By this method, up/down counter 1105 is synchronized to the amount of packet data stored in buffer 1104. A further input to buffer 1104 is a read (R) signal. The read (R) signal supplied by output controller 1106 enables buffer 1104 read circuitry to output the next byte of packet data including the EOP signal. The packet data from the buffer 1104 is applied to multiplexer 1107 as well as to time stamp calculator 1109. The EOP signal is supplied to output controller 1106.

Time stamp calculator 1109 calculates the final value of the time stamp (TS) for each packet as it leaves access interface transmitter 101. This is accomplished by latching the packet originate time (POT) field of the packet and subtracting that packet originate time (POT) from the current local time (LT) indication. That is, we are calculating the packet departure time (LTD) minus the packet originate time (POT), namely, TS'=LTD−POT. This updated TS' result is supplied to multiplexer 1107 for insertion into the packet header time stamp field as the new TS value at the appropriate instant under control of output controller 1106. The use of the packet departure time LTD in conjunction with the POT which was determined by using the packet arrival time LTA at the node simplifies the current time stamp calculation and allows use of only one time stamp field in the packet header, in accordance with an aspect of the invention. Again, it is noted that the same local time signal is used for the time stamp calculations in the node and that the same single time stamp field is used to transport both the packet originate time (POT) value and the updated time stamp (TS) value. The packet data output of multiplexer 1107 is supplied to line formatter 1108. Line formatter 1108 is also supplied with a data available (DA) signal from output controller 1106. The DA signal provides an indication of when packet data has been applied to the digital line formatter 1108 via multiplexer 1107. Such line formatter arrangements are known in the art. They typically perform such functions as idle flag insertion into the data stream during times when there are no packets, as well as zero bit stuffing to assure that the data patterns do not appear as a flag on the transmission line. Furthermore, line formatter 1108 provides a calculation of a so-called header check sequence of the packet to aid in detecting any transmission errors.

Output controller 1106 controls outputting of packet data from transmit process module 109. Inputs to output controller 1106 include the empty (E) indication signal and the end-of-packet (EOP) indication signal from buffer 1104. Output controller 1106 operates multiplexer 1107 as well as line formatter 1108 in order to enable the line formatter 1108 to process active packet data.

Up/down counter 1105 is employed to measure the amount of the data stored in buffer 1104. The amount of data stored in buffer 1104 is indicated by causing counter 1105 to count up when data is being written into buffer 1104 and to count down when data is being read out. To this end, buffer 1104 write control signal is supplied from input controller 1102 to the upcount input (U) of up/down counter 1105 and buffer 1104 read control signal from output controller 1106 is supplied to the downcount (D) input of counter 1105. Up/down counter 1105 is reset when buffer 1104 is empty via signal E.

Figure 12:
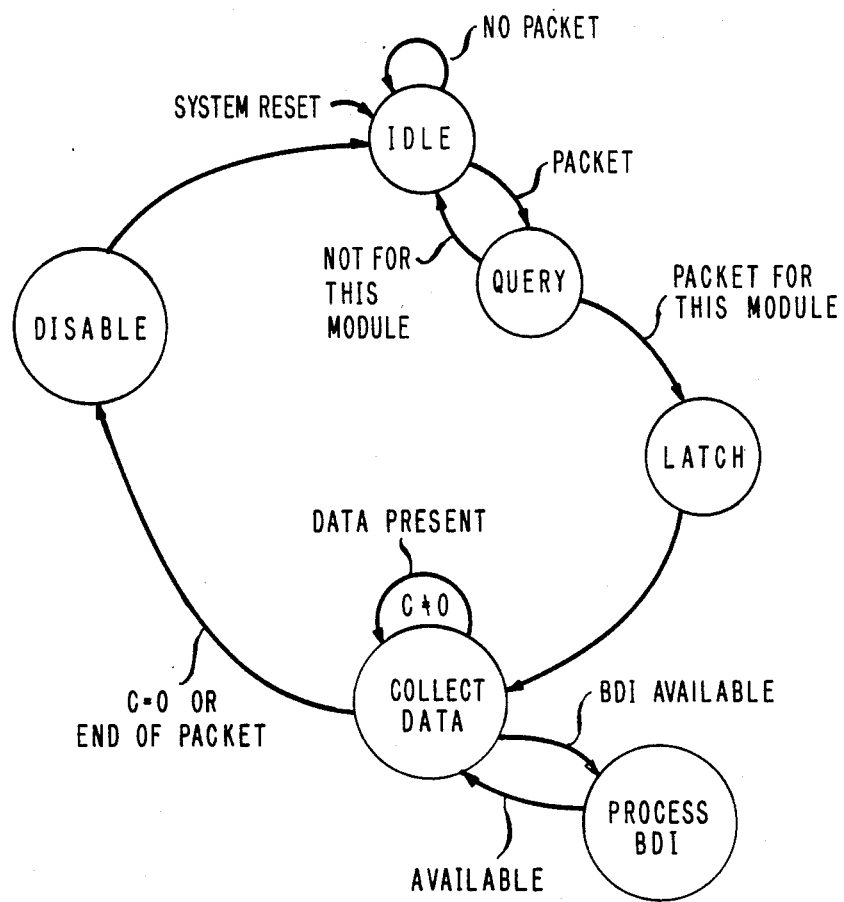
FIG. 12 shows a state diagram illustrating operations effected in input controller 1102 in transmit process modules 109 of FIG. 11.

Operation of input controller 1102 is shown in tha state diagram of FIG. 12. From system reset, the IDLE state is entered. Input controller 1102 remains in the IDLE state as long as no packets appear on transmit packet bus 108 and to count the amount of packet data stored in buffer 1104. When a packet is indicated on transmit packet bus 108, input controller 1102 passes to the QUERY state. In the QUERY state, input controller 1102 determines if the internal destination code in the packet header matches the address of this particular process module 109. If the packet internal destination code field does not match the particular process module 109 address, input controller 1102 returns to the IDLE state until another packet appears on transmit packet bus 108. If, however, the internal destination code does match the particular process module 109 address, input controller 1102 passes into the LATCH state. In the LATCH state, input controller 1102 latches the buffer status indications BS1, BS2 and BS3 for use in processing the current packet. Input controller 1102 also sets a counter C to a large nonzero value so that counter indications will not affect the next few data bytes of the packet being processed. Upon completion of these functions, input controller 1102 passes from the LATCH state to the COLLECT DATA state. In the COLLECT DATA state, input controller 1102 decrements the counter C for each byte of data which appears on transmit packet bus 108. Additionally, input controller 1102 supplies write pulses to buffer 1104 and up/down counter 1105 in order to store the packet data as it appears on transmit packet bus 108 and to count the amount of packet data stored in buffer 1104. When the bit-dropping indicator (BDI) field is available on packet transmit bus 108, input controller 1102 passes from the COLLECT DATA state to the PROCESS BDI state. In this PROCESS BDI state, input controller 1102 performs several functions. First, input controller 1102 latches the BDI field of the packet as it is entering the process module 109. Based on the old BDI and the buffer status indications BSI, BS2 and BS3, input controller 1102 chooses an appropriate counter value, C, consistent with the amount of data stored in buffer 1104. This counter value is used to determine the length of the packet being supplied to buffer 1104. Finally, in the PROCESS BDI state, input controller 1102 operates multiplexer 1103 to reinsert and store a new bit-dropping indicator (BDI) field derived from the old bit-dropping indicator and the buffer status indications as described above. When the BDI field is no longer available, input controller 1102 passes back to the COLLECT DATA state in order to collect the remainder of the packet, continuously decrementing the counter C. When the counter C goes to 0, or the end of a packet appears on transmit packet bus 108, input controller 1102 passes to the DISABLE state. In the DISABLE state, input controller 1102 first generates the end-of-packet (EOP) indication which will be stored in buffer 1104. Input controller 1102 also disables any further writing of data into buffer 1104 and upcounting of counter 1105. When these functions are accomplished, input controller 1102 passes to the IDLE state awaiting the next packet on transmit packet bus 108.

Figure 13:
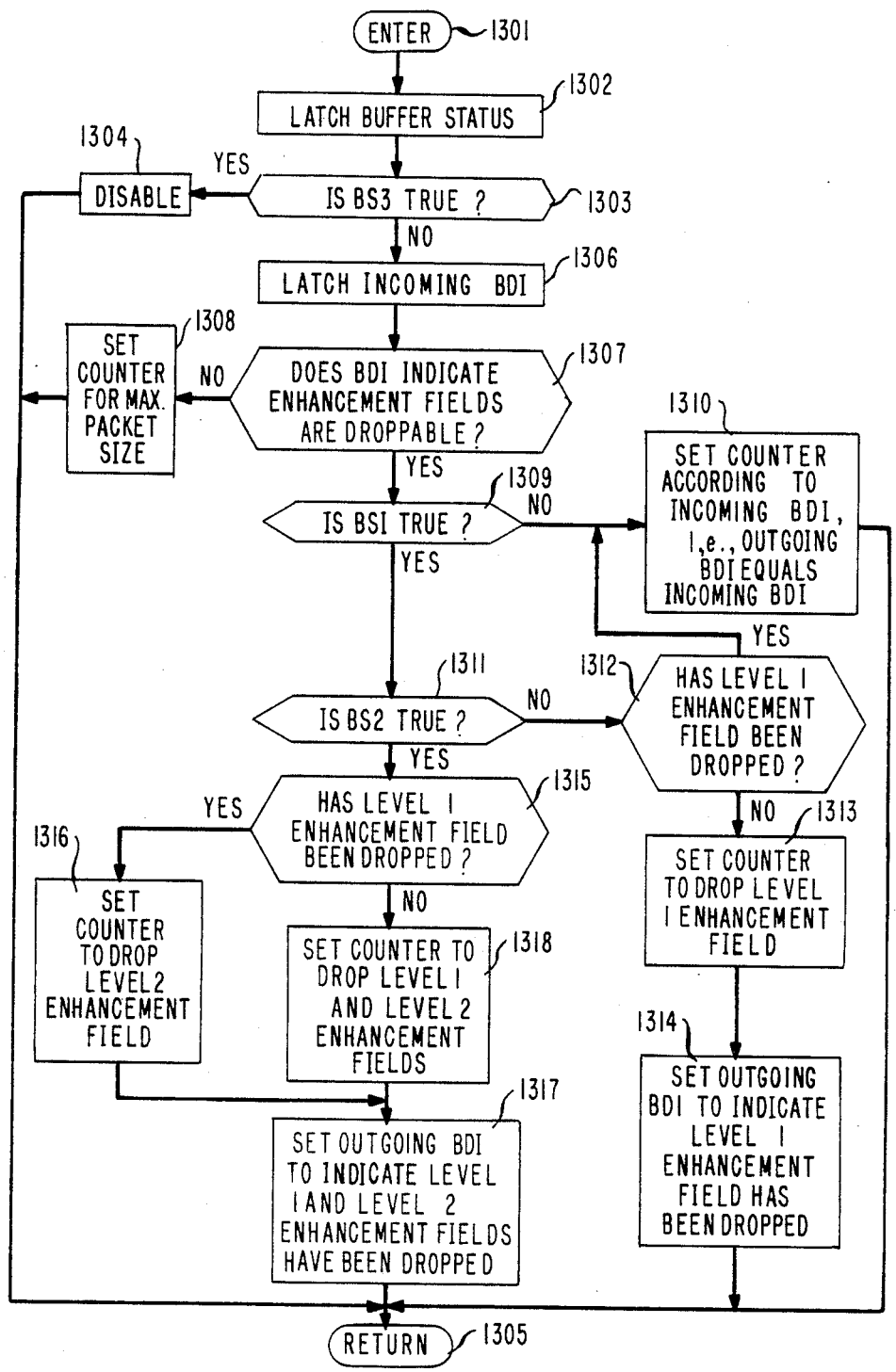
FIG. 13 is a flow chart of a sequence of operations also effected in input controller 1102 of transmit process modules 109 of FIG. 11.

FIG. 13 depicts a flow chart of the sequence of steps in input controller 1102 in setting an internal counter to determine bit dropping, packet length and the current BDI field for the packet being processed. Although the steps are shown sequentially in the flow chart, it will be apparent to those skilled in the art that the preferred implementation of these functions is with a read only memory (ROM) which examines all the necessary inputs simultaneously and performs all of the steps substantially simultaneously to yield the BDI field output and to set the internal counter in input controller 1102. The flow chart shown in FIG. 13 is entered for every packet which appears on packet transmit bus 108 in order to determine correct internal counter values. On appearance of a packet having an internal destination code which matches the address for this transmit process module 109, the sequence is entered via 1301. The first task to be performed is indicated in operational block 1302 at which time the buffer status values BS1, BS2 and BS3 are latched. This occurs simultaneously with the LATCH state as described in the previous state diagram of FIG. 12. Thereafter, conditional branch point 1303 tests to determine whether or not buffer 1104 is full. That is, whether additional data may be stored therein. If buffer 1104 is indeed full, as indicated by BS3 being true, i.e., a logical 1, further operation to determine the counter value is abandoned and the process returns through the disable block 1304 and return 1305 to its initial state of waiting for a packet to appear on transmit packet bus 108 destined for this transmit process module 109. That is to say, the current packet being processed is dropped in its entirety by disabling writing of buffer 1104 (FIG. 11). If, however, there is room in the buffer 1104 for an additional packet or more, as indictated by the test in setp 1303 yielding a NO result, the incoming BDI is latched, as indicated in block 1306, by input controller 1102. Conditional branch point 1307 tests the BDI field to determine whether the BDI field indicates a packet which can have one or more of the enhancement bit fields dropped or not. If the BDI field indicates that none of the enhancement bit fields can be dropped and the test result is NO, control is transferred to block 1308 and the internal counter is set to be the maximum value allowed for a packet in the system. Control is then returned to the main process via 1305. If the test result in step 1307 is YES, conditional branch point 1309 tests to determine whether BS1 is true, i.e., a logical 1. BSI is an indication of whether or not the amount of data stored in buffer 1104 is greater than the first predetermined threshold TL1. If the amount of data stored in buffer 1104 is not greater than the threshold TL1, as indicated by BS1 being false, i.e., a lgoical 0, none of the enhancement bit fields need be dropped and control is transferred to operational block 1310. Operational block 1310 causes the counter value to be set consistent with the incoming BDI. The outgoing BDI is also set equal to the incoming BDI. It should be noted that the incoming BDI may indicate that one or both of the enhancement bit fields have been dropped or that none of the enhancement bit fields has been dropped. This dropping of one or more of the enhancement bit fields may have occurred in some other switching or transmission node in the packet system. Thereafter, control is returned via 1305. If, however, the test result in step 1309 is YES, the amount of data stored in buffer 1104 is greater than the first threshold TL1 and conditioal branch point 1311 tests BS2 to determine whether or not the amount of data stored of buffer 1104 is greater than some predetermined threshold TL2. If the test result in step 1311 is NO, i.e., BS2 is not greater than threshold TL2, then conditional branch point 1312 tests to determine whether the level 1 enhancement bit field has been dropped. This test is performed by examining the BDI field in the incoming packet header. If the test result in step 1312 is YES, the level 1 enhancement bit field has been dropped, and control is transferred to operational block 1310 where the internal counter value is set consistent with the incoming BDI and the outgoing BDI is set to equal the incoming BDI. If the test result in step 1312 is NO, the level 1 enhancement bit field has not been dropped, and control is transferred to operational block 1313 where the internal counter is set in order to drop the level 1 enhancement bit field. Operational block 1314 sets the outgoing BDI to indicate that the level 1 enhancement bit field has indeed been dropped. Thereafter, control is returned to the main process via 1305. Returning to step 1311, if the test result therein is YES, the amount of data stored in buffer 1104 is greater than threshold TL2, and conditional branch point 1315 tests the BDI field of the packet being processed to determine whether the level 1 enhancement bit field has been dropped. If the test result in step 1315 is YES, the level 1 enhancement bit field has been dropped, and operational block 1316 causes the internal counter to be set to drop the level 2 enhancement bit field. Thereafter, operational block 1317 causes the outgoing BDI to be set to indicate that both the level 1 and level 2 ehancement bit fields have been dropped. Once the BDI has been set, control is returned to the main process via 1305. If the test result in step 1315 is NO, the level 1 enhancement bit field has not been dropped, and operational block 1318 causes the internal counter to be set to drop both the level 1 and level 2 enhancement bit fields. Thereafter, control is transferred to operational block 1317 which sets the outgoing BDI to indicate that both level 1 and level 2 enhancement bit fields have been dropped. Thereafter, control is returned to the main process via 1305. Although only two enhancement bit fields are used in this example, it will be apparent that this process could be expanded for any number of enhancement bit fields. It should also be noted that the bit fields are dropped from the packet in a prescribed order beginning from the bit field including the least significant bits toward the bit field including the most significant bits. It should be noted that the enhancement bit fields are dropped in order from the enhancement bit field including the last significant bits of the corresponding transmission channel toward the enhancement bit field including the most significant bits of the corresponding transmission channel.

Figure 14:
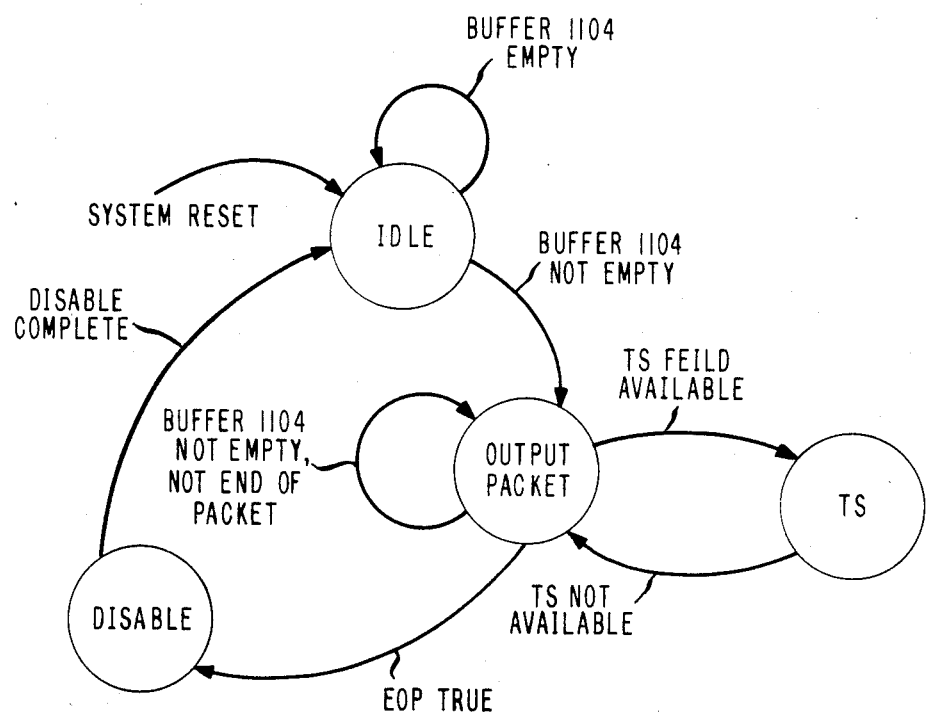
FIG. 14 shows a state diagram of operations effected in output controller 1106 in transmit process modules 109 of FIG. 11.

FIG. 14 depicts a state diagram of a sequence of steps illustrating the operation of output controller 1106 in the transmit process module 109 of FIG. 11. The state diagram is entered from system reset and the output controller 1106 transfers to the IDLE state. Output controller 1106 remains in the IDLE state as long as buffer 1104 is empty. When buffer 1104 is not empty, as indicated by a logical 0 empty (E) signal from buffer 1104, output controller 1106 transfers to the OUTPUT PACKET state. While in the OUTPUT PACKET state, output controller 1106 enables reading of a packet from buffer 1104 as well as decrementing up/down counter 1105. Output controller 1106 also operates multiplexer 1107 to allow passage of the packet data from buffer 1104. Finally, as each byte of packet data is read from buffer 1104, output controller 1106 enables line formatter 1108 to perform its operation. When the time stamp (TS) field is available in the packet being read from buffer 1104, output controller 1106 passes to the TS state. In the TS state, output controller 1106 operates multiplexer 1107 to insert the new time stamp field from time stamp calculator 1109 in the packet header. As with other bytes of packet data being outputted, output controller 1106 also enables line formatter 1108 to code the time stamp field for transmission to the digital line interfaces. When the time stamp field is no longer available, control passes back to the OUTPUT PACKET state and the above-mentioned functions are iterated. Output controller 1106 remains in the OUTPUT PACKET state as long as buffer 1104 is not empty and it is not the end of a packet as indicated by the EOP signal. The end of a packet is indicated by a logical 1 EOP signal appearing in the last byte of packet data from buffer 1104. The logical 1 EOP signal causes control to pass to the DISABLE state. In the DISABLE state, output controller 1106 disables the decrementing of up/down counter 1105, disables any further reading of buffer 1104 and causes the DA signal to become a logical 0 indicating to line formatter 1108 that the packet is no longer available. When line formatter 1108 no longer has packet data available to be outputted, it automatically outputs flag signals. Thereafter, output controller 1106 passes to the IDLE state where it awaits more packet data in buffer 1104 the IDLE state will be exited immediately.

Receive Process Module

Figure 15:
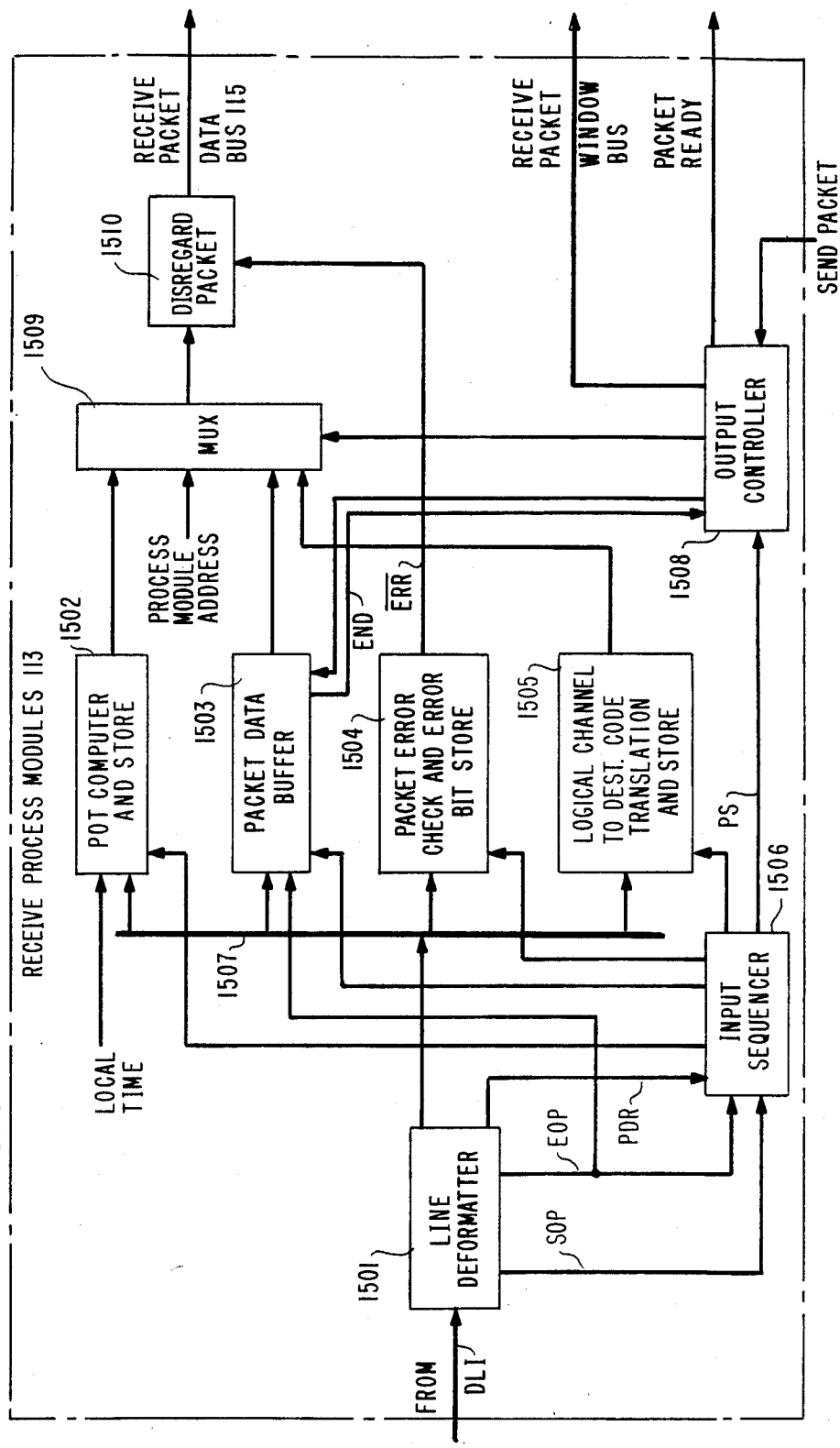
FIG. 15 depicts in simplified block diagram form details of receive process modules 113 of access interface receiver 102 of FIG. 1.

FIG. 15 shows in simplified block diagram form details of receive process modules 113, which are employed in the access interface receiver 102 of FIG. 1. The 32 time slot packetized time division multiplexed signals from an associated one of digital line interface units 112 (FIG. 1) are supplied at, in this example, a 2.048 Mb/sec rate to line deformatter 1501. Line deformatter 1501 functions include removal of idle flags from the packet data stream, removal of stuffed bits from the received packet data stream, and the generation of several control signals. These control signals are a start of packet (SOP) signal, an end of packet (EOP) signal and a packet data ready (PDR) signal. Finally, digital line deformatter 1501 outputs the received packet data in an eight-bit parallel form onto bus 1507. The start of packet (SOP) signal and the end of packet (EOP) signal are supplied to input sequencer 1506. The end of packet (EOP) signal is also supplied to packet data buffer 1503. The packet data is supplied by bus 1507 to packet originate time (POT) computer and store 1502, packet data buffer 1503, packet error check and error bit store 1504 and, finally, to logical channel to destination code translation and store 1505. Each of units 1502, 1503, 1504 and 1505 is controlled by input sequencer 1506. Input sequencer 1506 also supplies a packet stored (PS) signal to output controller 1508. Packet originate time (POT) computer and store 1502 examines the received packet data in the time stamp field and calculates the packet originate time (POT), namely, POT=LTA−TS, where TS is the time samp value from the time stamp field of the received packet and LTA is the local time upon the packet arriving in the particular one of receive process modules 113. LTA is derived from the local timing unit 120 (FIG. 1). This POT value is stored during the packet interval in preparation for outputting via multiplexer 1509 to the receive packet bus 115. Again, the use of the POT value calculated upon the arrival of a packet at a system node simplifies the time stamp computation and reduces the number of header time stamp fields, in accordance with an aspect of the invention. Multiplexer 1509 is controlled by output controller 1508. Packet data buffer 1503 simply stores all received packet data plus one flag bit which is called the end of packet flag (END). This flag bit is further used to delimit the packets upon their being outputted to receive packet bus 115. The stored packet data is supplied to multiplexer 1509 for outputting under control of output controller 1508. The end of current packet (END) signal is also supplied from packet data buffer 1503 to output controller 1508.

Packet data in the packet header is also provided to packet error check and error bit store 1504 via bus 1507. This unit generates a cyclic redundancy code (CRC) check of the packet header in order to detect any bit errors in transmission. A signal $\overline{ERR}$ is outputted from packet error check and error bit store 1504, which is an indication of whether or not the packet data is in error. This $\overline{ERR}$ signal is used to drop the entire packet if there is an error. The $\overline{ERR}$ signal is supplied to one input of disregard packet unit 1510. Finally, the packet data is also supplied from line deformatter 1501 to the logical channel to destination code translation and store 1505. This unit examines the received logical channel number (LCN) and uses the value of the received LCN to determine the one of receive access modules 116 to which the received packet must be supplied. The LCN is translated to the destination code value which is stored during packet reception and outputted to multiplexer 1509 during packet playback to the appropriate one of receive access modules 116. Also supplied to multiplexer 1509 is the receive process module address. Output controller 1508 controls inserting the POT value into the time stamp field and the generation of the destination code and process module address fields as well as the outputting of the packets to receive packet bus 115. The outputting of packets is obtained by interaction with receive bus controller 114 (FIG. 1). To this end, packet ready request signals are supplied to receive bus controller 114 and corresponding send packet signals are received from bus controller 114. The operation of bus controller 114 is identical to that of bus controller 107 described above.

Figure 16:
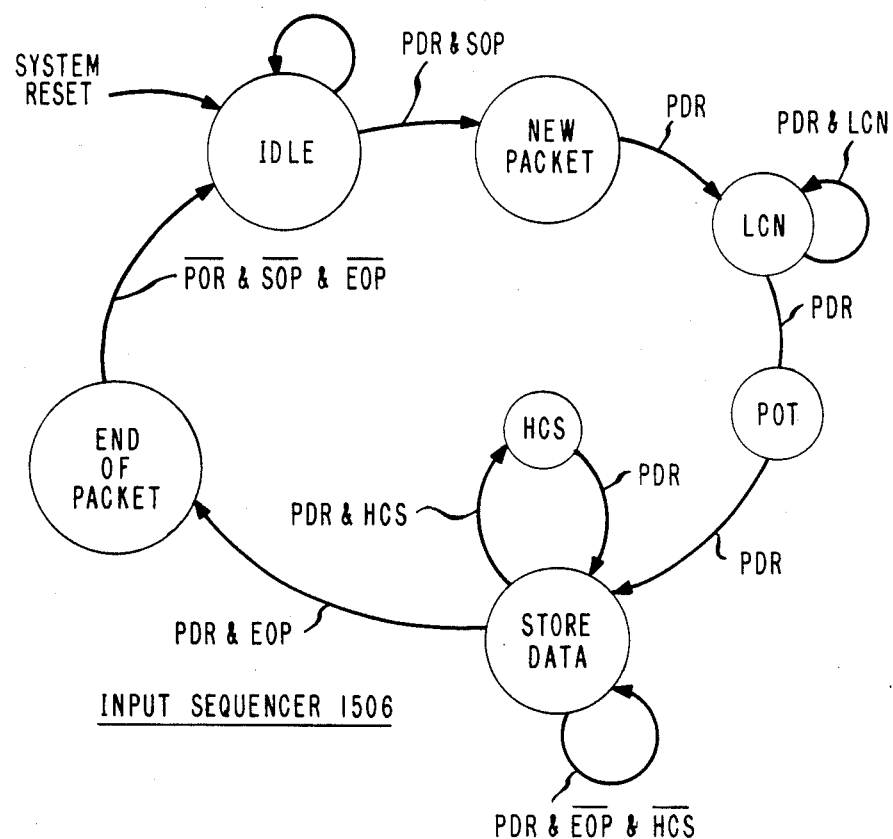
FIG. 16 shows a state diagram illustrating a sequence of operations effected in input sequencer 1506 in receive process modules 113 of FIG. 15.

FIG. 16 is a state diagram illustrating the operation of input sequencer 1506. The state diagram is entered from system reset into the IDLE state. Input sequencer 1506 remains in this IDLE state as long as there is no packet data provided from the digital line interface to line deformatter 1501. The indication that a packet is arriving is the start of packet (SOP) signal. When the start of packet (SOP) signal is true, i.e., a logical 1, and the packet data is ready, as indicated by the packet data ready (PDR) signal being a logical 1, input sequencer 1506 passes to the NEW PACKET state. In the NEW PACKET state, input sequencer 1506 enables packet data buffer 1503 to store the entire packet as it comes in and to continue storing the packet until it is finished, as evidenced by the end of packet (EOP) signal. At this time packet error check and error bit store 1504 is also enabled to begin calculation of the header check sequence. When the packet data ready (PDR) signal is again true, input sequencer 1506 passes into the LOGICAL CHANNEL NUMBER (LCN) state. In this LCN state, both packet data buffer 1503 writing, as well as logical channel to destination code translation and store 1505 operation, are enabled. Input sequencer 1506 remains in the LCN state for two data bytes, passing back to the LCN state when packet data ready (PDR) is true again. During this time, logical channel to destination code translation and store 1505 is latching the entire logical channel NUMBER (LCN) from the packet header, which takes two data bytes. Following the logical channel number (LCN), the next packet data ready (PDR) signal causes input sequencer 1506 to pass the the PACKET ORIGINATE TIME (POT) ENABLE state. When the packet originate time (POT) is available, input sequencer 1506 enables the POT computer and store 1502 to latch the time stamp field as it comes in on the packet. POT computer and store 1502 now has all the data necessary to calculate the packet originate time (POT) as described above. When the next data byte is available, as indicated by the packet data ready (PDR) signal being true again, input sequencer 1506 passes to the STORE DATA state. Input sequencer 1506 remains in the STORE DATA state until the occurrence of one of several possible events. The first event which could occur is that the header check sequence (HCS) has appeared on bus 1507. Upon the header check sequence (HCS) appearing on bus 1507, packet error check and error bit store 1504 receives the header check sequence (HCS) and finalizes calculation of the error bits $(\overline{ERR})$. Following the header check sequence, the next packet data ready (PDR) signal indicates that part of the information field of the packet is available. Input sequencer 1506 returns to the STORE DATA state and remains there until the rest of the information field of the packet is stored. Input sequencer 1506 leaves the STORE DATA state when the end of packet (EOP) signal is true, as well as the packet data ready (PDR) signal being true and passes to the END OF PACKET state where the final data byte of the current packet is stored in packet data buffer 1503. At this time, upon recepton of the inverses of packet data ready $(\overline{PDR})$, start of packet $(\overline{SOP})$ and end of packet $(\overline{EOP})$, packet data buffer 1503 is disabled and input sequencer 1506 outputs the packet stored (PS) signal and returns to the IDLE state, waiting for another input packet.

The packet output process of receive process modules 113 operates as follows: During packet input, the POT computer and store 1502, packet error check and error bit store 1504 and logical channel to destination code translation and store 1505 all compute results based on the current input packet header. These results are available for outputting in serial form and are remultiplexed into the packet in the appropriate fields by multiplexer 1509 under control of output controller 1508. During the packet output cycle, output controller 1508 controls both multiplexer 1509 and packet data buffer 1503 by enabling or disabling the respective read controls. If a received packet includes errors, the error bit $(\overline{ERR})$ from packet error check and error bit store 1504 is used to inhibit the packet data from passing to receive packet bus 115 by enabling disregard packet unit 1510. If the packet is indeed in error, a string of zeros will be supplied to receive packet bus 115 in place of the packet.

Figure 17:
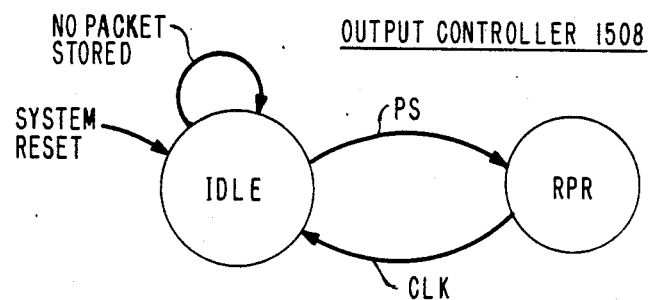
FIGS. 17 and 18 show state diagrams of operations effected in output controller 1508 in receive process modules 113 of FIG. 15.
Figure 18:
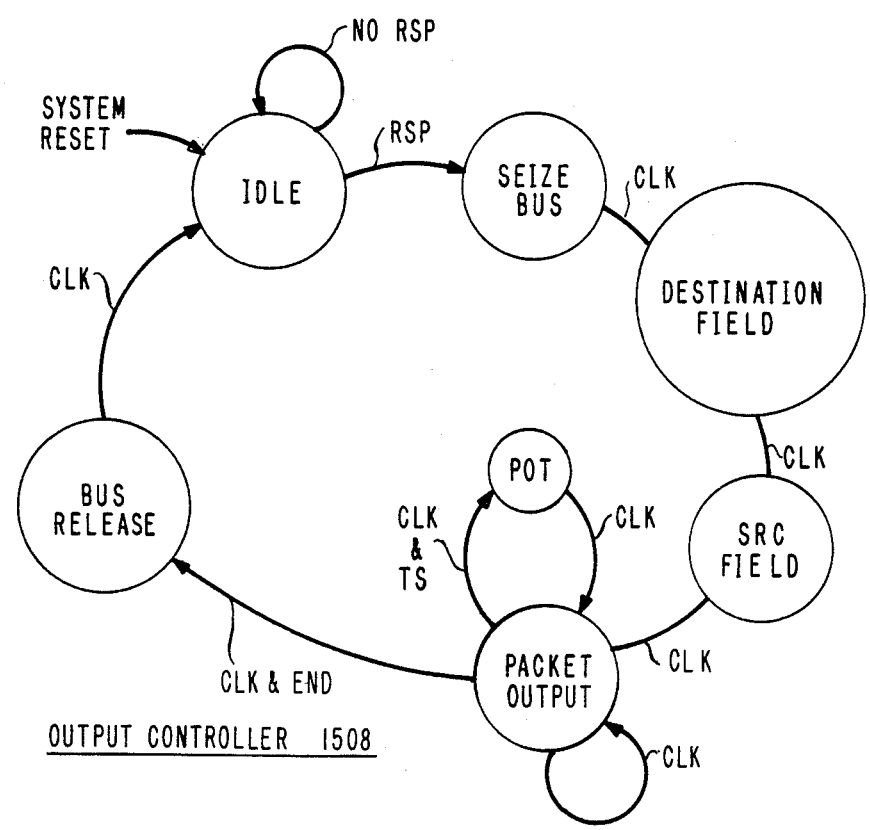

The operation of output controller 1508 in effecting the packet output process is illustrated in the state diagrams of FIGS. 17 and 18.

FIG. 17 shows a state diagram of the interaction of output controller 1508 with bus controller 114 (FIG. 1). The state diagram is entered into the IDLE state from system reset. When the packet stored (PS) signal from input sequencer 1506 is true, output controller 1508 passes to the RECEIVE PACKET (RPR) READY state. At this time, the packet ready signal going to bus controller 114 is asserted. On the following system clock (CLK) pulse, output controller 1508 passes back to the IDLE state.

FIG. 18 shows a state diagram illustrating operation of output controller 1508 in controlling the outputting of packets from receive process modules 113 to receive packet bus 115. The packet output process is operated for the most part synchronously with the system clock so the following description of the operation of output controller 1508 will indicate operations occurring on successive clock pulses. Output controller 1508 enters the IDLE state from system reset. As long as there are no packets stored in packet data buffer 1503 to be outputted, output controller 1508 remains in the IDLE state. Upon reception of a receive send packet (RSP) signal from bus controller 114, output controller 1508 passes from the IDLE state to the SEIZE BUS state during which receive packet bus 115 is seized for outputting a packet and packet data buffer 1503 is enabled for reading. This is achieved in well-known fashion by a signal on the receive packet window bus. During the next two clock (CLK) pulses, i.e., the output time for the first two packet header fields, multiplexer 1509 is enabled to supply the internal destination code to receive packet bus 115. This is done during the DESTINATION FIELD state and the SRC FIELD state. On the next clock (CLK) pulse following the internal destination code field, multiplexer 1509 is enabled to supply the process module address to the receive packet bus 115. After outputting the receive process module address, the next clock pulse (CLK) causes output controller 1508 to pass into the DATA OUTPUT state where most of the packet data is outputted onto receive packet bus 115. At the time when the time stamp (TS) field is available to be outputted to receive packet bus 115, however, output controller 1508 passes to the PACKET ORIGINATE TIME (POT) state and enables multiplexer 1509 to output the POT result stored in POT computer and store 1502. Upon the following clock (CLK) pulse, output controller 1508 returns to the PACKET OUTPUT state and will remain there for successive system clock (CLK) pulses until the remainder of the current packet is outputted from packet data buffer 1503 to receive packet bus 115. When the END signal from packet data buffer 1503 is true, which indicates the end of the current packet being outputted therefrom, and on the next clock (CLK) pulse, output controller 1508 passes to the BUS RELEAE state. In this BUS RELEASE state, the final byte of the current packet is outputted from packet data buffer 1503 to receive packet bus 115 and receive packet bus 115 is released for use by another one of receive process modules 113. During this BUS RELEASE state, the output controller 1508 is also reset and, on the following clock (CLK) pulse, the output controller 1508 passes back to the IDLE state.

Receive Access Module

Figure 19:
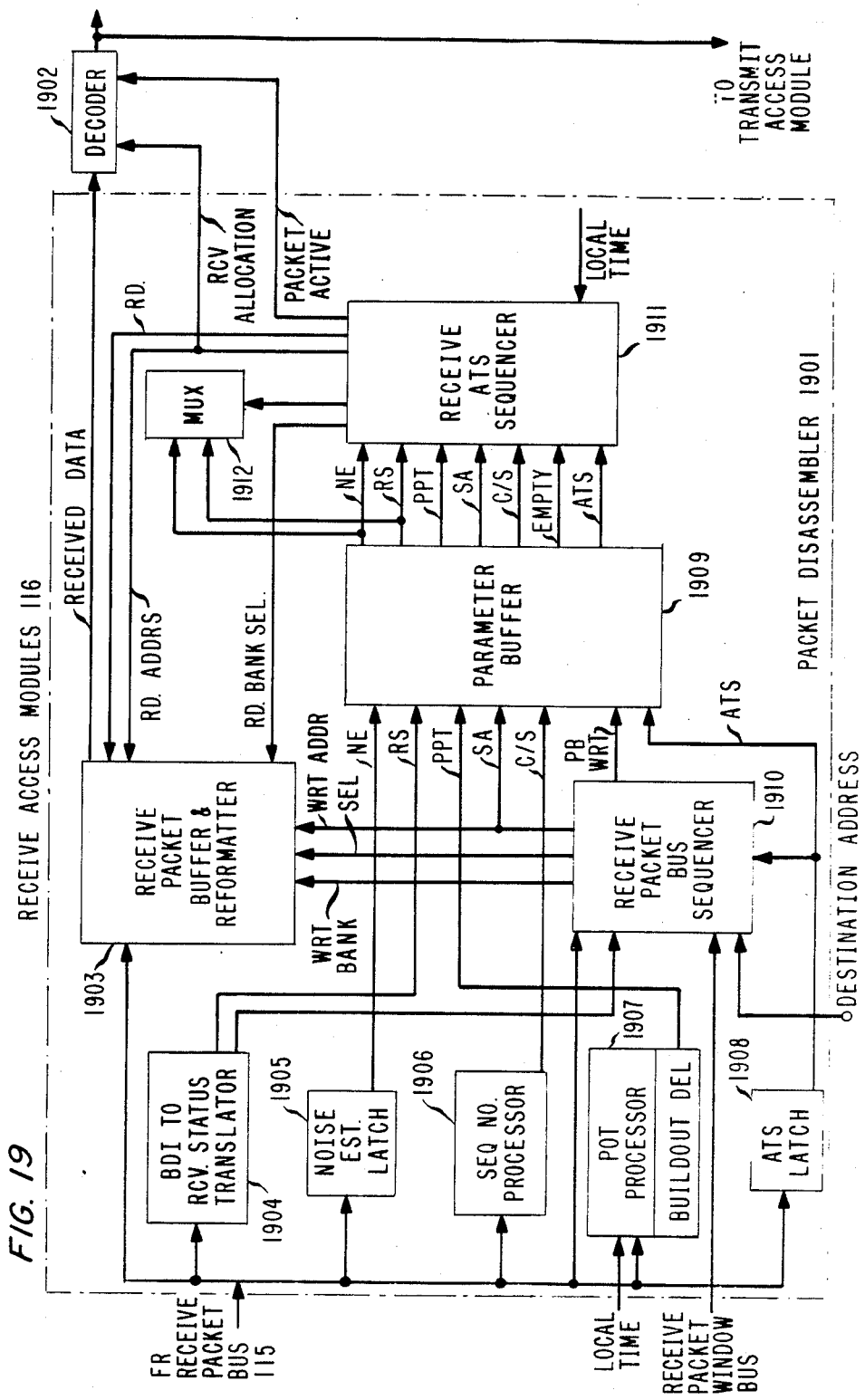
FIG. 19 depicts in simplified block diagram form details of receive access modules 116 of access interface receiver 102 of FIG. 1.

FIG. 19 shows in simplified block diagram form details of receive access modules 116 employed in the access interface receiver 102 of FIG. 1. It is noted, that packets experience both fixed and random delays in a packet network. In reconstructing digital samples from packets it is important that the effects of the random delays be minimize in order to eliminate gaps and the like from resulting in the reconstructed signals. This is achieved, in individual ones of receive access modules 116 by adjusting the delay experienced by each of the packets to some fixed overall delay ($D_O$) interval. The fixed overall delay internal comprises a known fixed delay ($D_F$) interval caused by transmission and processing of the packets, a random delay (TS) interval measured by employing the unique time stamp technique, and an adjustable delay (D) interval for building out the random delay interval to a known fixed build out delay (BLD) interval. That is, $(TS+D)+D_F=D_O$, where $TS+D=BLD$. In a specific example, $D_O=44$ milliseconds, $D_F=24$ milliseconds and $BLD=20$ milliseconds. Accordingly, shown are packet disassembler 1901 and decoder 1902. Included in packet disassembler 1901 is receive packet buffer and reformatter 1903, BDI to receive status translator 1904, noise estimate latch 1905, sequence number processor 1906, packet originate time (POT) processor and buildout delay register 1907 and access time slot (ATS) latch 1908 all of which receive packet data from receive packet bus 115. The local time signal from local timing unit 120 (FIG. 1) is supplied to POT processor and buildout delay register 1907 and to receive ATS sequencer 1911. The receive packet window bus from receive packet bus 115 is supplied to receive packet bus sequencer 1910. Also supplied to receive packet bus sequencer 1910 is the packet data from receive packet bus 115, a packet length signal from BDI to receive status translator 1904, a late packet indication from POT processor and buildout delay register 1907, an internal destination address from the receive access module back-plane and the access time slot signal (ATS) from ATS latch 1908. Receive packet bus sequencer 1910 supplies a plurality of control signals to receive packet buffer and reformatter 1903. Specifically, the control signals include a write (WRT) signal, a memory bank select (BANK SEL) signal and a write address (WRT ADDR) signal. Additionally, receive packet bus sequencer 1910 supplies a start address (SA) signal (same as WRT ADDR) and a parameter buffer write control signal (PBWRT) to parameter buffer 1909. The start address (SA) signal indicates the memory location in receive packet buffer and reformatter 1903 in which the first sample is stored of the current packet in the current time slot. Although not specifically shown, receive packet bus sequencer 1910 supplies control signals to each of BDI to receive status translator 1904, noise estimate latch 1905, sequence number processor 1906, POT processor and buildout delay register 1907 and ATS latch 1908 for effecting control of those units, as will be described below. Parameter buffer 1909 is a first-in first-out (FIFO) type buffer which stores relevant information from the packet header that is used by receive access time slot (ATS) sequencer 1911 for controlling the outputting of reformatted packet data from receive packet buffer and reformatter 1903. To this end, a receive status (RS) signal is supplied to buffer 1909 from BDI to receive status translator 1904; a background noise estimate (NE) signal is supplied from noise estimate latch 1905; a packet playout time (PPT) signal is supplied from POT processor and buildout delay 1907; a cat/sched (C/S) control signal is supplied from sequence number processor 1906; and finally, the ATS control signal is supplied from ATS latch 1908. As indicated above, parameter buffer 1909 stores this plurality of signals for use by receive ATS sequencer 1911 for outputting data from receive packet buffer and reformatter 1903 in the appropriate PCM or ADPCM format. Accordingly, the receive status (RS) signal, the noise estimate (NE) signal, the start address (SA) signal, the packet playout time (PPT) signal, the cat/sched (C/S) signal, the ATS signal and an additional signal (EMPTY) which indicates that parameter buffer 1909 is empty are supplied to receive ATS sequencer 1911. If the Empty signal is true, i.e., a logical 1, parameter buffer 1909 is empty and there are no packets to be processed in receive packet buffer and reformatter 1903. Additionally, the receive status (RS) signal and the noise estimate (NE) signal are supplied to multiplexer 1912. A local time signal from local timing unit 120 (FIG. 1) is also supplied to receive ATS sequencer 1911.

Receive ATS sequencer 1911 operates to control the outputting of reformatted data from packet disassembler 1901. To this end, it generates a signal for controlling multiplexer 1912 to supply the receive status and noise estimate signals at the appropriate times to decoder 1902 for use, a will be described below in the decoder 1902 description. Receive ATS sequencer 1911 also generates a packet active signal which is also supplied to decoder 1902 for use as will be described below. To control the outputting of reformatted data from receive packet buffer and reformatter 1903, receive ATS sequencer 1911 supplies thereto a read (RD) signal, a read address (RD ADDR) signal and a read memory bank select (RD BANK SEL) signal. Operation of receive ATS sequencer 1911 is described below in conjunction with the state diagram in FIG. 23.

BDI to receive status translator 1904 includes a latch memory and read only memory unit (ROM) (not shown). The incoming BDI field is employed as an address to the ROM which provides the receive status (RS) signal and the packet length signal. Specifically, the receive status signal indicates the type of coding which was employed in the corresponding access interface transmitter. For example, whether it was 8-bit PCM coding, embedded ADPCM coding, that is, 4/3-bits embedded coding, 4/2-bits embedded coding, or 3/2-bits embedded coding, four-bit ADPCM, three-bit ADPCM or two-bit ADPCM. The length signal indicates the length of the packet to be played out of packet disassembler 1901, i.e., whether or not any of the enhancement bit fields have been dropped for the embedded coding packets.

Noise estimate latch 1905 is a four-bit memory which stores a background noise estimate from the receive packet header.

Sequence number processor 1906 includes a latch memory unit, a virtual sequence counter and control logic (not shown) to generate the so-called cat/sched (C/S) signal, in accordance with an aspect of the invention. If the packet is an initial packet of a speech spurt, this packet must be scheduled for playout according to the packet playout time generated by POT processor and buildout delay register 1907. The identification of a packet as the initial packet in an information spurt is obtained by advantageously employing the unique virtual sequence number scheme, in accordance with an aspect of the invention. As indicated above, the virtual sequence includes a continuous sequence of numbers not including the unique number used to identify the initial packet in the information spurt. If it is not an initial packet, the packet is concatenated with the previous packet for playout. If one or more packets have been lost prior to receiving this particular packet, sequence number processor 1906 will schedule the current packet for playout, also according to the packet playout time generated by POT processor and buildout delay register 1907.

Figure 20:
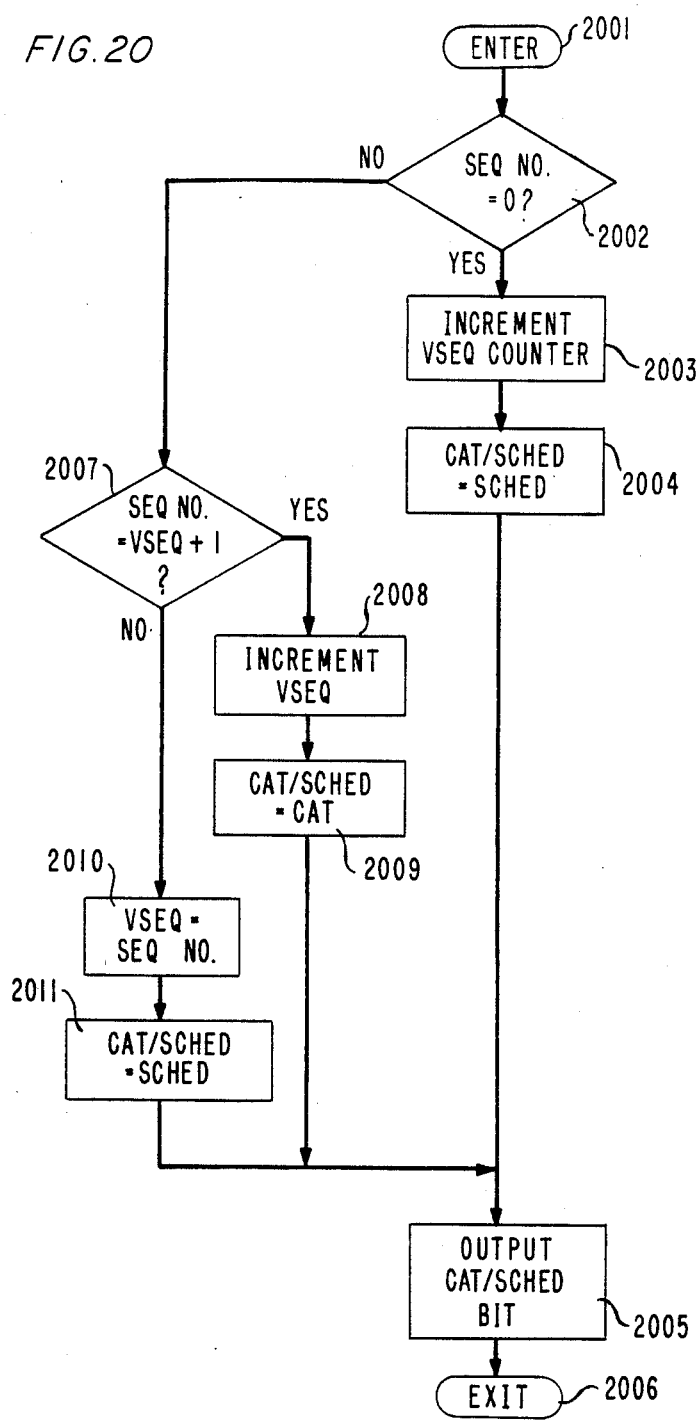
FIG. 20 is a flow chart of a sequence of operations effected in sequence number processor 1906 in receive access modules 116 of FIG. 19.

FIG. 20 is a flow chart illustrating the step of the control logic of sequence number processor 1906 in generating the cat/sched (C/S) signal. Accordingly, the sequence is entered via 2001 for each packet processed by this particular receive access module 116. Thereafter, conditional branch point 2002 tests to determine whether the sequence number is the unique number reserved to identify the initial packet in the information spurt, in this example, zero (0). If the test result in step 2022 is YES, operational block 2003 causes the virtual sequence counter to be incremented. Since the test result in step 2002 was YES, indicated that the packet is the initial packet in a speech spurt, operational block 2004 sets the cat/sched (C/S) signal to sched, which will cause the playout of this initial packet to be scheduled according to the packet playout time (PPT) generated in POT processor and buildout delay 1907. The operational block 2005 causes the cat/sched (C/S) signal to be outputted to parameter buffer 1909. Thereafter, the sequence is exited via 2006. Returning to step 2002, if the test result therein is NO, the packet virtual sequence number is not zero (0), which indicates that it is not an initial packet in an information spurt and conditional branch point 2007 tests to determine whether the sequence number is equal to the value in the virtual sequence counter plus one. The test in step 2007 is to determine whether or not the current packet being processee follows a lost packet or not, in accordance with an aspect of the invention. If the test result is YES, this packet does not follow a lost packet and operational block 2008 causes the virtual sequence counter to be incremented. Operational block 2009 causes the cat/sched (C/S) signal to be set to cat. Thereafter, operational block 2005 causes the cat/sched (C/S) signal to be outputted to parameter buffer 1909. The sequence is thereafter exited via 2006. Returning to step 2007, if the test result therein is NO, indicating that the current packet has followed a lost packet, operational block 2010 causes the virtual sequence counter to be set to the sequence number of the current packet. The next processed packet, if there is one in the information spurt, would be a cat packet which is concatenated on the current scheduled packet. Operational block 2011 causes the cat/sched indication to be set to sched since the current packet requires to be scheduled for playout according to the packet playout time generated by POT processor and buildout delay 1907. That is to say, the current packet that has followed a lost packet is considered to be an initial packet and treated as such. Thereafter, operational block 2005 causes the cat/sched bit to be outputted to parameter buffer 1909. The process is thereafter exited via 2006.

POT processor and buildout delay register 1907 includes a latch memory for storing the POT field from the packet header and control logic (not shown) for generating the packet playout time (PPT) and the late packet indication. Also included is a register to provide the programmed system buildout delay for the packet. The packet palyout time (PPT) is a local time value when a first sample from a corresponding packet information field is to be read from receive packet buffer and reformatter 1903. The packet playout time is computed so that the packet data experiences the desired fixed overall delay ($D_O$). This fixed overall delay is realized by uniquely employing the packet originate time (POT) value and the buildout delay (BLD) value. As indicated above, the randomness of the delay experienced by the packet is eliminated by "building out" the delay to a known value. Then, the fixed overall delay is obtained by outputting the first sample of the packet information field at the local time value equal to the packet playout time (PPT) value, namely $PPT = POT + BLD$, where $POT = LTA - TS$.

Figure 21:
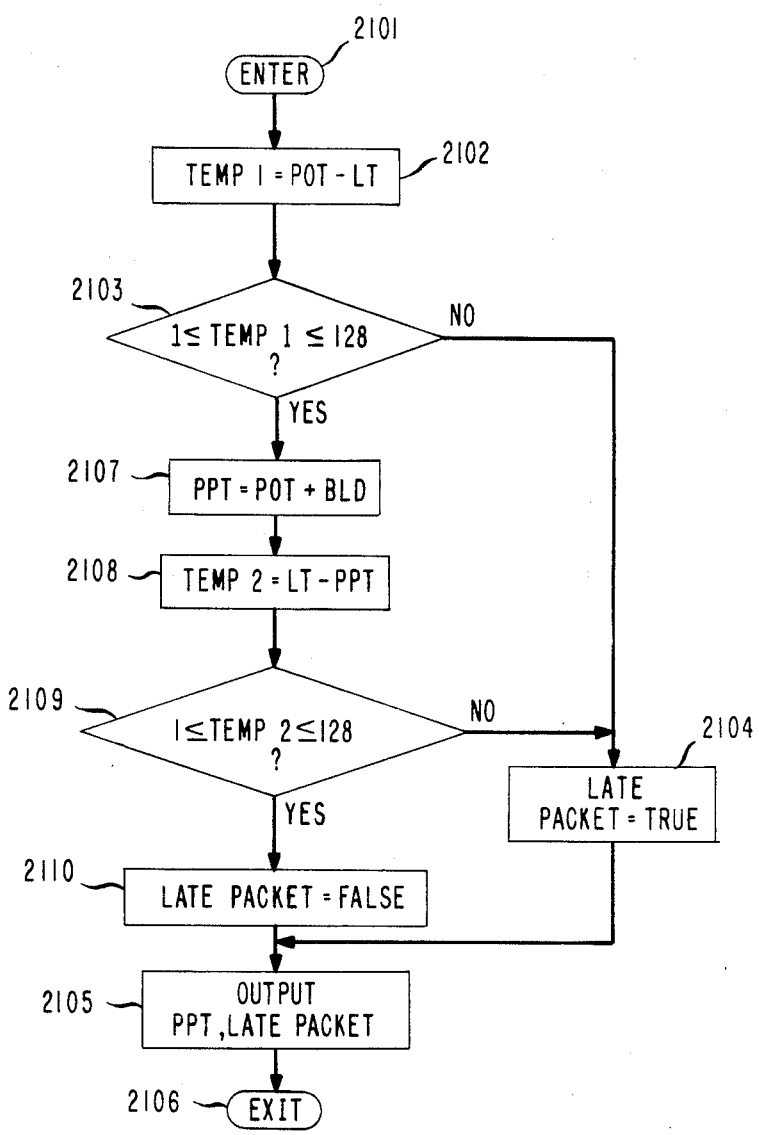
FIG. 21 is a flow chart of a sequence of operations effected by control logic in packet originate time (POT) processor and buildout delay register 1907 in receive access modules 116 of FIG. 19.

FIG. 21 is a flow chart of the sequence of steps effected by the control logic of POT processor and buildout delay register 1907 in generating the packet playout time (PPT) signal and the late packet indication signal. Accordingly, the sequence is entered via 2101 for each packet processed by this particular receive process module 116. Thereafter, operational block 2102 generates a temporary variable, TEMP1, which is the algebraic difference between the packet originate time value from the packet header time stamp field less the local time obtained from the local timing unit 120, i.e., $TEMP1 = POT - LT$. Conditional branch point 2103 performs a test to determine whether or not the arithmetic for generating the time stamp value is correct. In this example, the test is whether TEMP1 is a value in the range equal to or greater than 1 and equal to or less than 128. This test checks whether or not the arithmetic in calculating the packet playout time has overflowed. If the arithmetic has overflowed, any results obtained therefrom would be erroneous. If the test result in step 2103 is NO, the arithmetic has overlfowed and operational block 2104 causes the late packet signal to be set to true, i.e., to a logicla 1. Thereafter, operational block 2105 causes the outputting of the true late packet signal. The process is then exited via 2106. If the test in step 2103 yields a YES result, the arithmetic has not overflowed and operatioal block 2107 calculates the packet playout time (PPT) which is equal to the packet originate time (POT) plus the system buildout delay (BLD), i.e., $PPT = POT + BLD$. The POT(n) currently being generated is $POT(n) = LTA(n) - TS(n-1)$, where LTA(n) is the packet arrival time of the current packet and TS(n-1) is the time stamp value from the time stamp field in the header of the currently arriving packet, and the current time stamp value TS(n) being generated is $TS(n) = LTD(n) - POT(n)$, where LTD(n) is the current packet departure time from the node. Operational block 2108 generates another temporary variable TEMP2, which is equal to the local time minus the packet playout time, i.e., $TEMP2 = LT - PPT$. TEMP2 is used to determine if the packet is late relative to the system buildout delay. To this end, conditional branch point 2109 tests the TEMP2 variable to determine whether TEMP2 is within predetermined limits. In this example, the test is whether TEMP2 is a value within the range of equal to or greater than 1, and equal to or less than 128. If the test rest in step 2109 is NO, the current packet is late relative to the system buildout delay and operational block 2104 sets the late packet indication to be true. Thereafter, operational block 2105 again outputs the late packet true indication. Then, the sequence is exited via 2106. IF the test result in step 2109 is YES, the packet is not late relative to the buildout delay and operational block 2110 sets the late packet indication to be false, i.e., a logical 0. Operational block 2105 causes the packet playout time signal and the late packet false indication to be outputted. Again, the sequence is outputted via 2106.

ATS latch 1908 is simply a latch memory which stores the ATS portion of the internal destination code field of the packet header.

Receive packet buffer and reformatter 1903 includes a plurality of memory units (not shown) for appropriately storing the bits of the packet information fields. Specifically, the memory units are arranged to separately store packet data in odd and even time slots. Each of these memory units includes storage elements for storing, for example, all the sign bits, all the (1) bits, all the (2) bits, etc., or all the sign (s) bits, all the (a) bits, all the (b) bits, etc., through the number of bits used in the particular packet. In this example, the maximum number of bits is 8 including the sign bit. Writing the received packet information field bits into the receive packet buffer and reformatter 1903 is controlled by receive packet bus sequencer 1910, which will be described in conjunction with the state diagram shown in FIG. 22. The so-called reformatting of the packet information fields is effected in the reading out of the data from the memory units under control of receive ATS sequencer 1911, which operation will be described in conjunction with the state diagram shown in FIG. 23. As indicated above, the packet information field in either of the formats shown in FIGS. 3 or 4 is written into receive packet buffer and reformatter 1903 and the data is reformatted into the desired PCM or ADPCM format upon reading the data out thereform. This is realized by proper selection of the write and read address lines of receive packet buffer and reformatter 1903. It is noted that if the reformatted PCM sample is 8-bit PCM, then decoder 1902 is by-passed (not shown) in well known fashion.

Figure 22:
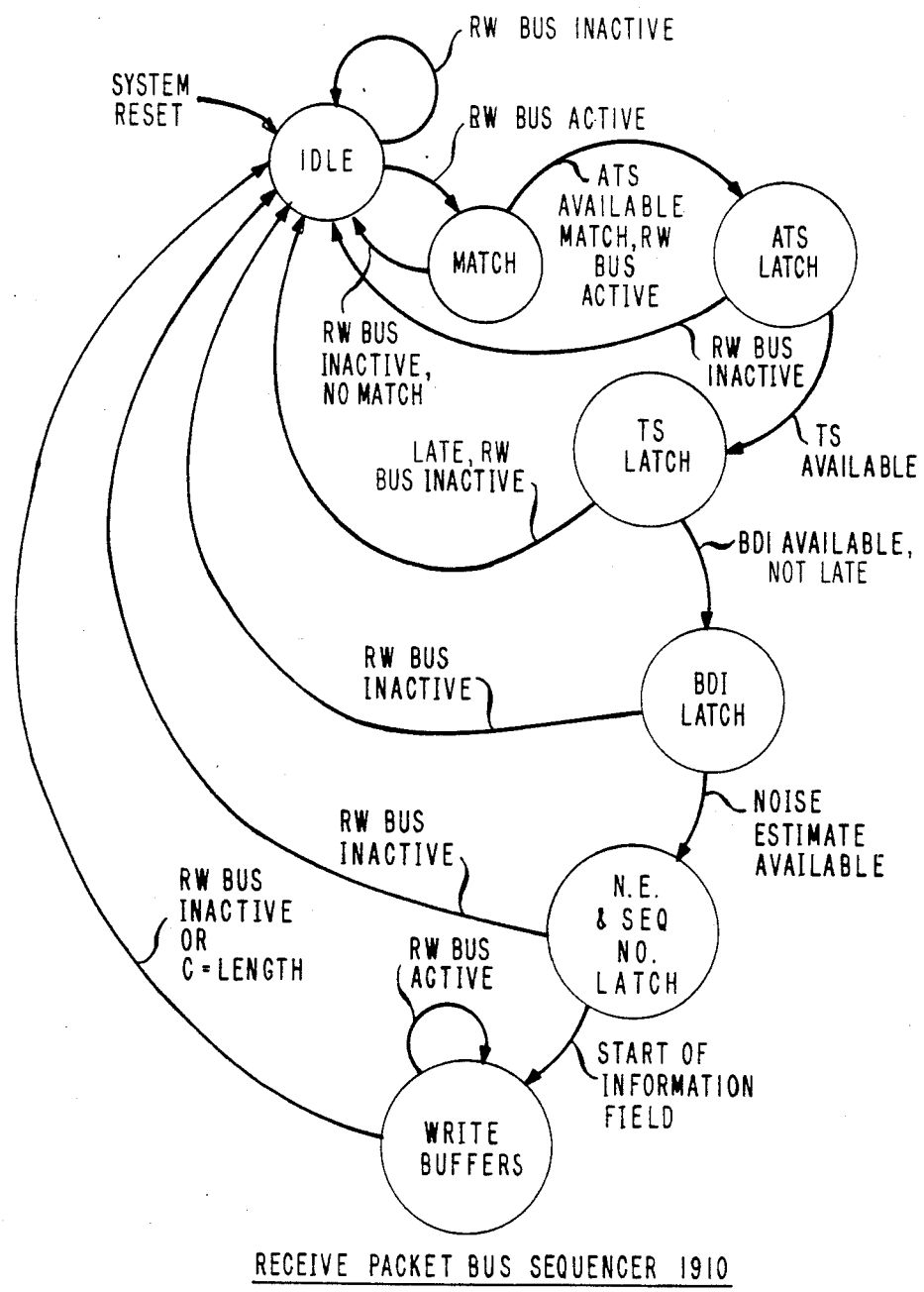
FIG. 22 shows a state diagram illustrating operations effected in receive packet bus sequencer 1910 in receive access modules 116 of FIG. 19.

FIG. 22 shows a state diagram illustrating the sequence of setps of the operation of receive packet bus sequencer 1910 in effecting writing of received packet data into receive packet buffer and reformatter 1903 and writing of the packet parameters into parameter buffer 1909. Accordingly, the IDLE state is entered from system reset. While in the IDLE state, the following actions are performed: processing of the packets is disabled on the input side to receive packet buffer and reformatter 1903, and receive packet bus sequencer 1910 waits for a receive window (RW) bus active indication from receive packet bus 115 indicating that a packet is proceeding to be outputted onto receive packet bus 115. When the receive window bus becomes active, receive packet bus sequencer 1910 passes to the MATCH state. In the MATCH state, receive packet bus sequencer 1910 checks the destination code field of the incoming packet against the destination address supplied to this particular one of receive access modules 116 from the back-plane. If there is no match, the receive packet bus sequencer 1910 remains in the MATCH state waiting for the receive window bus to become inactive. No further processing is effected on this packet since the packet is destined for some other one of receive access modules 116. When the receive window bus becomes inactive, the receive packet bus sequencer 1910 returns to the IDLE state waiting once again for another packet to be outputted onto the receive packet bus 115. If the destination code field matches the supplied destination address, receive packet bus sequencer 1910 waits until the ATS field is available. When the ATS field is available, the ATS state is entered and the ATS field is latched in ATS latch 1908. If the receive packet window bus becomes inactive, receive packet bus sequencer 1910 returns to the IDLE state. When the time stamp field is available receive packet bus sequencer 1910 passes to the TS LATCH state. In the TS LATCH state the time stamp information is latched into POT processor and buildout delay 1907, and the POT processor is enabled to calculate the packet playout time and the late packet or on-time packet indication. If the packet is late, the processing halts at this point causing the packet to be discarded and the receive packet bus sequencer 1910 remains in the TS LATCH state until the receive window bus once again becomes inactive. At that time, receive packet bus sequencer 1910 passes back to the IDLE state to wait for the next packet. If the packet is not late, the receive packet bus sequencer 1910 waits in the TS LATCH state until the bit dropping indicator (BDI) field is available. When the BDI field is available, the receive packet bus sequencer 1910 passes to the BDI LATCH state. In the BDI LATCH state, the received BDI is latched in BDI to receive status translator 1904 which is enabled in order to determine the receive status and length information for the following part of the packet. If for some reason the receive window bus becomes inactive while BDI processing is taking place, the receive packet bus sequencer 1910 once again passes back to the IDLE state and waits for another packet. No status information or data is written into either receive packet buffer and reformatter 1903 or parameter buffer 1909. When the noise estimate (NE) field becomes available, the receive packet bus sequencer 1910 passes from the BDI LATCH state to the NOISE ESTIMATE and SEQUENCE NUMBER LATCH state. While in this state, receive packet bus sequencer 1910 causes the noise estimate and the sequence number field to be latched and causes the sequence number processing to be enabled in order to determine whether or not this packet is a concatenate packet or a scheduled packet. A counter is also loaded at this time with the length value of the packet which was obtained in the BDI LATCH state and was provided to receive packet bus sequencer 1910 by BID to receive status translator 1904. This length value indicates whether any one or more of the enhancement bit fields have been dropped from the packet information field. When the packet information field begins, receive packet bus sequencer 1910 passes to the WRITE BUFFERS state. Upon entry into the WRITE BUFFERS state, all the processed results of the header processing are written into the parameter buffer 1909. The buffer writing is enabled by the write signal (PBWRT) which is supplied to parameter buffer 1909. While in the WRITE BUFFERS state, receive packet buffer and reformatter 1903 is enabled via a write (WRT) signal so that the information field of the packet may be written. Receive packet bus sequencer 1910 also provides the write address (WRT ADDR) to receive packet buffer 1903 so that the byte of data being written may be stored in an appropriate memory location associated with the particular time slot that the packet is being transmitted in. When each byte of the information field is available, a counter (C) in receive packet bus sequencer 1910 is decremented until it finally times to. When the receive window bus becomes inactive because of the end of a packet or the counter C times out to the appropriate length of the packet, the writing of receive packet buffer and reformatter 1903 is disabled and the receive packet bus sequencer 1910 passes back to the IDLE state waiting for the next packet.

Figure 23:
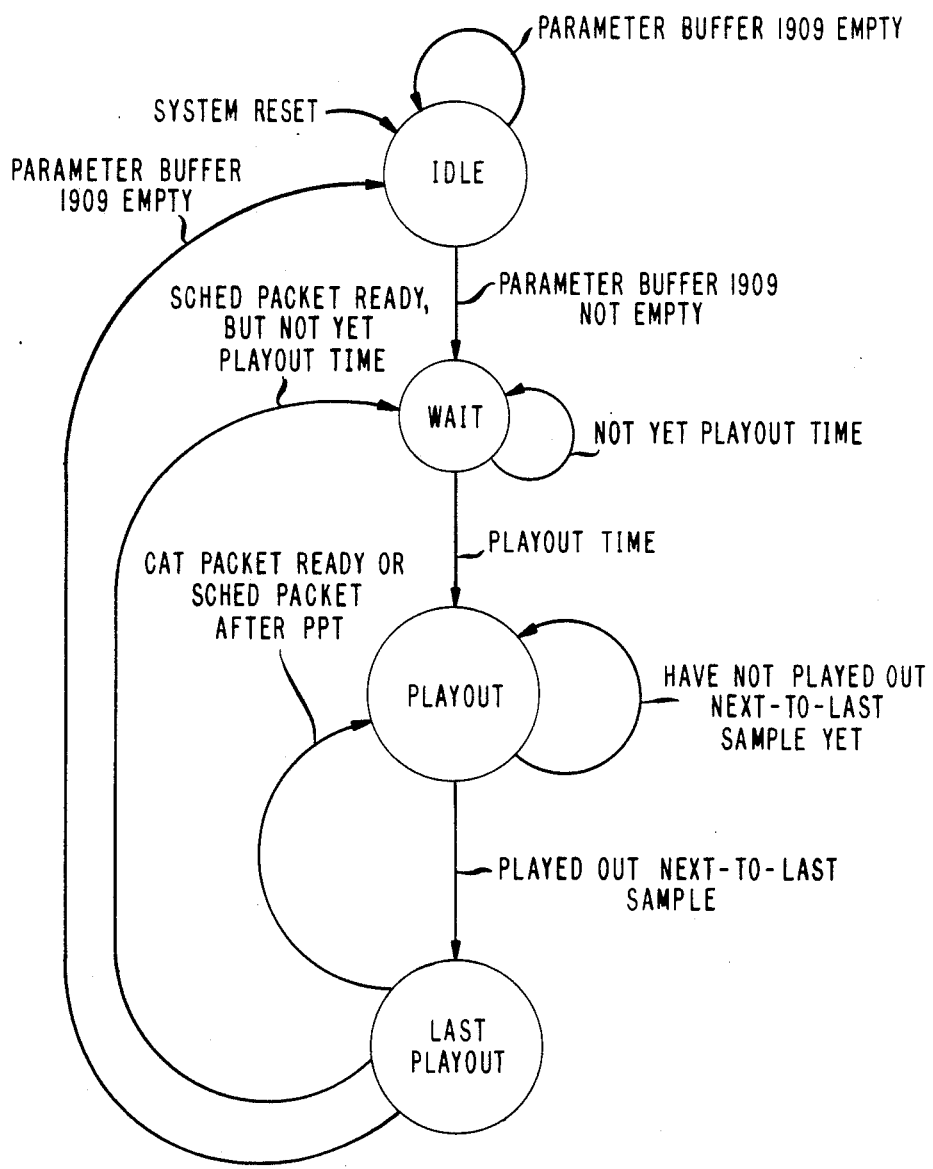
FIG. 23 depicts a state diagram illustrating operations effected in ATS sequencer 1910 in receive access modules 116 of FIG. 19.

FIG. 23 depicts a state diagram illustrating the sequence of steps in the operation of receive ATS sequencer 1911 in controlling reading packet data from receive packet buffer and reformatter 1903 and controlling the operation of multiplexer 1912 in supplying information to decoder 1902. Accordingly, the IDLE state of the sequence is entered on system reset. while in the IDLE state, all processing of packet output data from receive packet buffer and reformatter 1903 is disabled. Receive ATS sequencer 1911 also controls operation of multiplexer 1912 to set the receive allocation to the noise estimate (NE) from the previous packet during silent intervals and sets the receive packet data from receive packet buffer and reformatter 1903 to all zeros during the time slot that noise is to be inserted. When parameter buffer 1909 supplies a not-empty indication to receive ATS sequencer 1911, it passes to the WAIT state. While in the WAIT state, receive ATS sequencer 1911 first reads parameter buffer 1909 values for the packet which is being prepared for playout. Receive ATS sequencer 1911 sets the receive allocation to the noise estimate (NE) as read from parameter buffer 1909 and sets the packet active indication to inactive for this access time slot (ATS). The receive data from receive packet buffer and reformatter 1903 is made all zeros during this time slot since it is an inactive time. Receive packet buffer 1903 read address is initialized for this packet and receive ATS sequencer 1911 waits for the local time to equal the packet playout time as read from parameter buffer 1909. When the packet playout time is reached, receive ATS sequencer 1911 passes to the PLAYOUT state. While in the PLAYOUT state, receive ATS sequencer 1911 performs the following functions: packet buffer and reformatter 1903 is enabled for reading out packet data; the read address is supplied to receive packet buffer and reformatter 1903 for this access time slot (ATS); the receive allocation is set to the receive status (RS) as read from parameter buffer 1909; the packet active signal is set to active (true) for this ATS; receive packet buffer and reformatter 1903 address is incremented and managed while the packet playout is underway; and, finally, the PLAYOUT state is maintained until receive packet buffer and reformatter 1903 address reaches 127, i.e., until the next to last sample of the packet has been played out. As indicated above, there are 128 samples in a packet interval. When the next to last sample of the packet has been played out of receive packet buffer and reformatter 1903, receive ATS sequencer 1911 passes to the LAST PLAYOUT state. During the LAST PLAYOUT state, the last sample of this packet is read from receive packet buffer and reformatter 1903 by providing the read address, read enable and memory bank select signals thereto, and processing of the next packet in the sequence of the speech spurt begins. The receive allocation is set to the receive status from parameter buffer 1909 for as in playing out the other samples of the packet. Finally, parameter buffer 1909 empty signal is checked to determine whether there is another packet to be played out or not. If there is another packet to be played out, the cat/sched (C/S) signal is interrogated to determine whether receive ATS sequencer 1911 must pass back to the WAIT state or back to the PLAYOUT state. If the cat/sched (C/S) signal indicates that the next packet is a concatenate packet, receive ATS sequencer 1911 returns to the PLAYOUT state and concatenates the packet to be played out to the packet which was just played out. If the cat/sched (C/S) signal indicates that this is a schedule packet but the playout time has not yet been reached, receive ATS sequencer 1911 passes back to the WAIT state in order to wait for the playout time to be achieved. If parameter buffer 1909 is empty, this indicates that no more packets are available for playout on this ATS and receive ATS sequencer 1911 passes back to the IDLE state waiting for more packets to be processed. Again, in this example the samples are read out of receive packet buffer and reformatter 1903 in either the 8-bit PCM format or the ADPCM format of FIG. 3 and FIG. 4, respectively.

Figure 24:
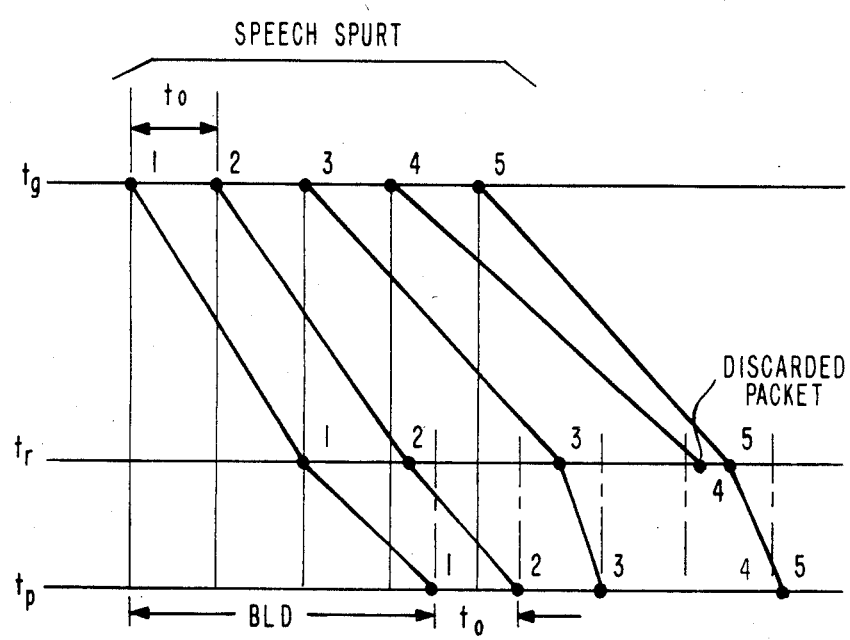
FIG. 24 illustrates delays experienced by packets in transmission and the playing out of such packets in access interface receiver 102.

FIG. 24 shows in graphical form the generation of individual packets in a speech spurt in transmitter 101 and the recovery of those generated packets in receiver 102. As shown, the packets are generated in access interface transmitter 101 at the packet originate interval ($t_o$) which in this example is 16 milliseconds. The transmitted packets are received at access interface receiver 102 at arbitrary intervals with random transmission delays as indicated by the packet receive time ($t_r$). Then, shown is the attempted equalization of the random delays caused in the transmission of the packets as indicated by the packet playout time ($t_p$). As shown, the playout time of the initial packet in the speech spurt is built out to the network buildout delay (BLD). Upon playout of the initial packet, the subsequent packets are played out at the packet originate interval ($t_o$), which is, in this example, 16 milliseconds, for packets in a continuous information spurt and also providing that they are not determined to be late packets. In this example, if the packet arrives late, it is discarded. As indicated in FIG. 24, packet 4 is late and is discarded. Thereafter, packet 5 is played out as a scheduled packet by the packet disassembler.

Encoder

FIG. 25 shows in simplified block diagram form details of encoder 204 employed in voice processing module 201 of FIG. 2. Encoder 204 is employed ot encode voiceband PCM signals, i.e., speech, voiceband data and tones into ADPCM signals. In this example, 8-bit $\mu$-law PCM signals are converted to linear form and, then, encoded into one of several possible ADPCM signals. For example, linear PCM samples may be converted into 4 bit, 3 bit or 2 bit ADPCM samples. Additionally, the ADPCM samples may include so-called embedded coding. For example, the output samples may be 4/2-bit embedded coding, 4/2-bit embedded coding or 3/2-bit embedded coding. As indicated above, such coding arrangements are known in the art. See, for example, U.S. Pat. No. 4,437,087 issued Mar. 13, 1984 for an adaptive ADPCM coding arrangement. Also. see U.S. Pat. No. 4,519,073 issued May 21, 1985 for a variable rate adaptive ADPCM coding arrangement.

Accordingly, in FIG. 25 linear PCM samples $s_l(k)$ are supplied to a plus (+) input of difference circuit 2501 and a sample estimate $s_e(k)$ is supplied from adaptive predictor 2506 to a minus (−) input of difference circuit 2501 which generates a difference sample d(k). Difference sample d(k) is supplied to variable rate quantizer 2502 which, under control of a control signal supplied via bit rate controller from controller 207 (FIG. 2), generates the ADPCM output sample I(k). Variable rate quantizer 2502, in this example, includes three separate adaptive quantizers for generating either the 4-bit, 3-bit or 2-bit ADPCM sample I(k) under control of controller 207 (FIG. 2). Such adaptive quantizers are known in the art. See, for example, CCITT Recommendation G.721 "32 kbit/s Adaptive Differential Pulse Code Modulation (ADPCM)", VIIIth CCITT Plenary Assembly, Maloga-Torremolinos, Spain, Vol. 111, pp. 125-159, October 1984, for one such adaptive quantizer. The ADPCM sample I(k) is supplied to quantizer adaptation unit 2503, variable rate inverse quantizer 2504 and to packet assembler 202 (FIG. 2). Variable rate inverse quantizer 2504 also includes three adaptive inverse quantizers which perform the inverse functions of the adaptive quantizers of variable rate quantizer 2502 and generate a quantized version of the difference sample, namely, $d_q(k)$. Again, the particular one of the inverse quantizers that is used is under control fo control signal supplied via bit rate controller 2510 from controller 207 (FIG. 2). The adaptive inverse quantizers are, in this example, 4-bit, 3-bit and 2-bit and are selected depending on the particular coding being used. For example, if 4/2-bit embedded coding is being used in a particular time slot, a 4-bit adaptive quantizer is selected in variable rate quantizer 2502 and a 2-bit variable rate adaptive inverse quantizer is selected in variable rate inverse quantizer 2504. An example of an adaptive inverse quantizer tha may be employed in variable rate inverse quantizer 2504 is disclosed in the CCITT Recommendation G.721 cited above. The quantized version of the difference sample $d_q(k)$ is supplied to one input of summing circuit 2505 and the sample estimate is supplied to another input of summing circuit 2505 which provides the algebraic sum thereof at its output, namely, reconstructed sample $s_r(k)$. The reconstructed sample $s_r(k)$ is supplied to adaptive predictor 2506. Adaptive predictor 2506 generates estimate sample $s_e(k)$ which is an estimate of the linear PCM input sample $s_l(k)$. One such adaptive predictor is also disclosed in the CCITT Recommendation G.721 cited above. Variable rate quantizer adaptation unit 2503 generates the quantizer and inverse quantizer adaptation scale factors $y_a(k)$ and $y_b(k)$, respectively. Scale factor $y_a(k)$ is supplied to the variable rate quantizer 2502 and scale factor $y_b(k)$ is supplied to variable rate inverse quantizer 2504. Again, variable rate quantizer adaptation unit 2503 includes three quantizer adaptation units, in this example, one for 4-bit, one for 3-bit and one for 2-bit quantization. The selection of the particular one or ones of the quantizer adaptation units is also under control of control signals supplied via bit rate controller 2510 from controller 207 (FIG. 2). By way of an example, if 4/2-bit embedded coding is being used, 4-bit scale factor $y_a(k)$ adaptation is selected for variable rate quantizer 2502, and 2-bit scale factor $y_b(k)$ adaptation is selected for variable rate inverse quantizer 2504. As is apparent, the scale factor adaptation selected under control of controller 207 has to match the adaptive quantizer selected in variable rate quantizer 2502 and also the inverse adaptive quantizer selected in variable rate inverse quantizer 2504. One such quantizer adaptation unit including an adaptation speed control and a quantizer scale fator adaptation unit is disclosed in the CCITT Recommendation G.721 cited above.

Both variable rate quantizer adaptation unit 2503 and adaptive predictor 2506 have so-called state variables that are updated in the adaptation proces. For simplicity and clarity of description, these are illustrated as being in state variables unit 2507. Typically, such state variables are stored in memory locations (not shown) and are updated during each sample interval (k). It will be apparent to those skilled in the art that variable rate quantizer adaptation unit 2503 state variables are contained in the adaptation speed control and the quantizer scale factor adaptation unit in the individual quantizer adaptation units used therein and that the predictor 2506 state variables are the predictor coefficients. These state variables may be initialized by setting the values in the memory locations to prescribed values and may be held constant by inhibiting updating of the stored values in well known fashion. In this example, the state variables in the scale factor adaptation units are those for DELAYB and DELAYC (see pages 138–139 of the CCITT Recommendation G.721 cited above) and in the adaptation speed control units the one for DELAYA (see page 141 of the CCITT recommendation G.721). The state variable values for the adaptive predictor 2506 are the predictor coefficients. These state variables are also disclosed in the CCITT Recommendation G.721 cited above.

Also included in encoder 204 are control elements for controlling the encoder state variables, in accordance with an aspect of the invention, in order to recover from transmission errors and lost packets, and to minimize the effects of artificial gaps in the receive information. In accordance with one aspect of the invention, the values of the state variables are held constant, i.e., not updated, upon the particular transmission channel activity becoming inactive until a predetermined interval has elapsed or the transmission channel status become active, whichever occurs first. If the transmission channel status becomes active before the predetermined interval has elapsed, the hold state is terminated and adaptation of the state variables resumes. If the predetermined interval elapses, then the state variables are initialized to prescribed values. Again, the state variables to be initialized are contained in variable rate quantizer adaptation unit 2503 and in adaptive predictor 2506. It is noted that the state variables are actually contained in adaptation speed control units and quantizer scale factor adaptation units within the particular quantizer adaptation units comprising variable rate quantizer adaptation unit 2503. Particular values of the state variables are disclosed in the CCITT Recommendation G.721 cited above. In this example, the initial value of state variable DELAYA in the adaptation speed control is zero (0), the initial values of state variables DELAYB and DELAYC in the quantizer scale factor adaptation unit are digital 544 and digital 34816, respectively, and the predictor coefficients are initialized to zero (0), values.

The control of the state variables is realized by supplying the packet active signal from controller 207 (FIG. 2) to enable/hold decoder 2508. Enable/hold decoder 2508, in response to a true, i.e., logical 1, packet active signal, indicating a packet is being processed in a particular time slot, generates a true operate signal, a true counter reset signal and a false, i.e. logical 0, counter enable signal. When the packet active signal is false, enable/hold decoder 2508 generates a false operate signal and counter reset signal and a true counter enable signal. The operate signal is supplied to state variables unit 2507 for inhibiting, resetting or enabling their adaptation as necessary. The counter reset signal is supplied to frame counter 2509 and the counter enable signal is supplied to frame counter 2509 and timeout detector 2511. Counter 2509, in this example, counts at an 8 kHz rate up to 2048 which represents 256 milliseconds. If counter 2509 times out, a true output signal is generated which is supplied to time-out detector 2511. Counter 2509 is incremented for each frame that no packet is present. The count of 2048 was selected so that the state variables would not be initialized during the interval between words during normal speech. Time-out detector 2511, in response to a true counter enable signal and a false time-out signal, generates a true hold signal and a false initialize signal. When the counter enable signal and time-out signal are both true, a false hold signal and a true initialize signal are generated. When both the counter enable and time-out signals are false, time-out detector 2511 generates false hold and initialize signals. The hold and initialize signals are supplied to state variables unit 2507 to control the state variables accordingly. The reason for holding the state variables constant is to preserve the speech signal adaptation for so-called intersyllabic speech gaps. Consequently, the variables are only initialized when the gaps are greater than a predetermined interval, in this example, 2048 frames or one quarter second.

Figure 26:
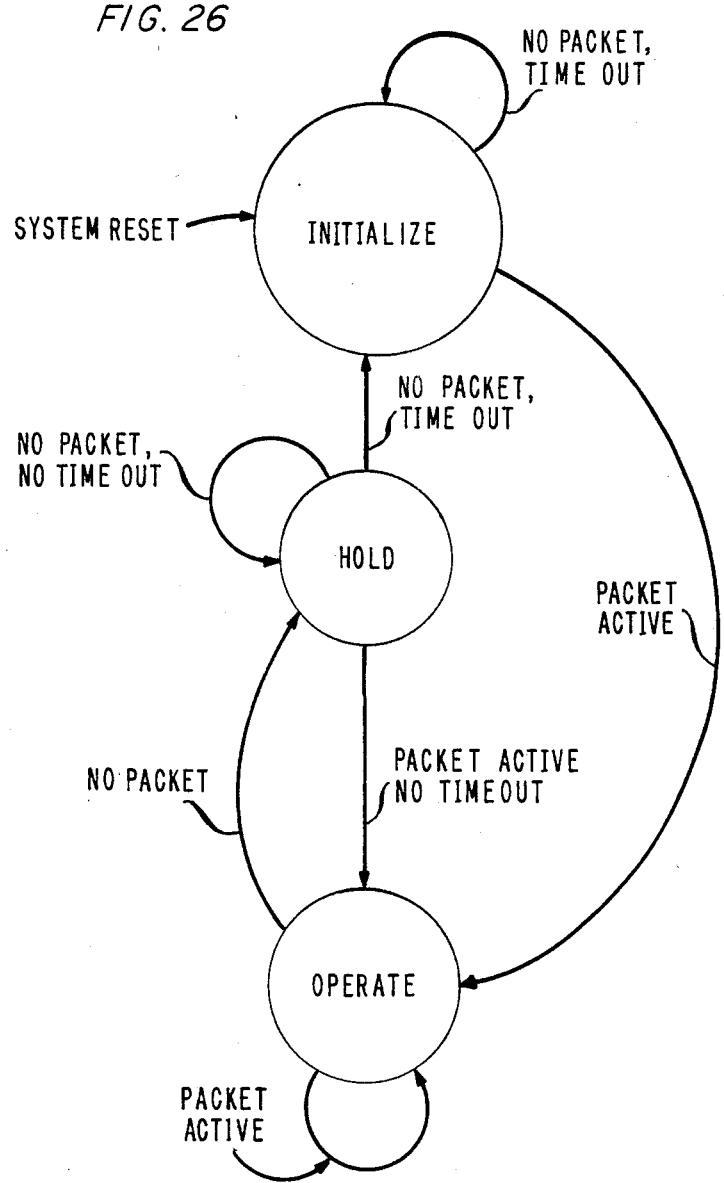
FIG. 26 shows a state diagram illustrating operation of aspects of encoder 205.

FIG. 26 is a state diagram which illustrates the encoder 204 state variables control operation. Accordingly, the INITIALIZE state is initially entered from system reset. The state variables are initialized upon the counter enable signal being true and frame counter 2509 yielding a true time-out signal, indicating it has "timed-out". Again, the state variables of the quantizer adaptation units in variable rate adaptation unit 2503 and of adaptive predictor 2506 are initialized to the values indicated above by storing those values in appropriate memory locations. Upon the packet active signal being true, indicating a packet is being processed, the OPERATE state is entered and enable/hold decoder 2508 generate true operate and reset signals and a false counter enable signal. Consequently, adaptation of the state variables is enabled and frame counter 2509 is reset to zero (0). This OPERATE state is maintained and encoder 204 adaptation continues until the packet active signal becomes false, indicating no packet is being processed. Then, the HOLD state variables and counter enable state is entered. In this HOLD state, enable/hold decoder 2508 generates false operate and counter reset signals and a true counter enable signal. Time-out detector 2511 generates a true hold signal and a false initialize signal. Consequently, the values of the state variables are inhibited from being updated and are held constant. This HOLD state is maintained as long as there is no packet being processed and frame counter 2509 has not timed out. If a packet subsequently appeared, as indicated by the packet signal being true and the counter 2509 has not timed out, the OPERATE state is again entered and operation is as described above. If no packet is present and frame counter 2509 times out as indicated by a true time-out signal, timeout detector 2511 generates a true initialize signal and a false hold signal and the INITIALIZE state is again entered and the state variables are initialized as described above. The INITIALIZE state is maintained until a packet is again present.

Decoder

Figure 27:
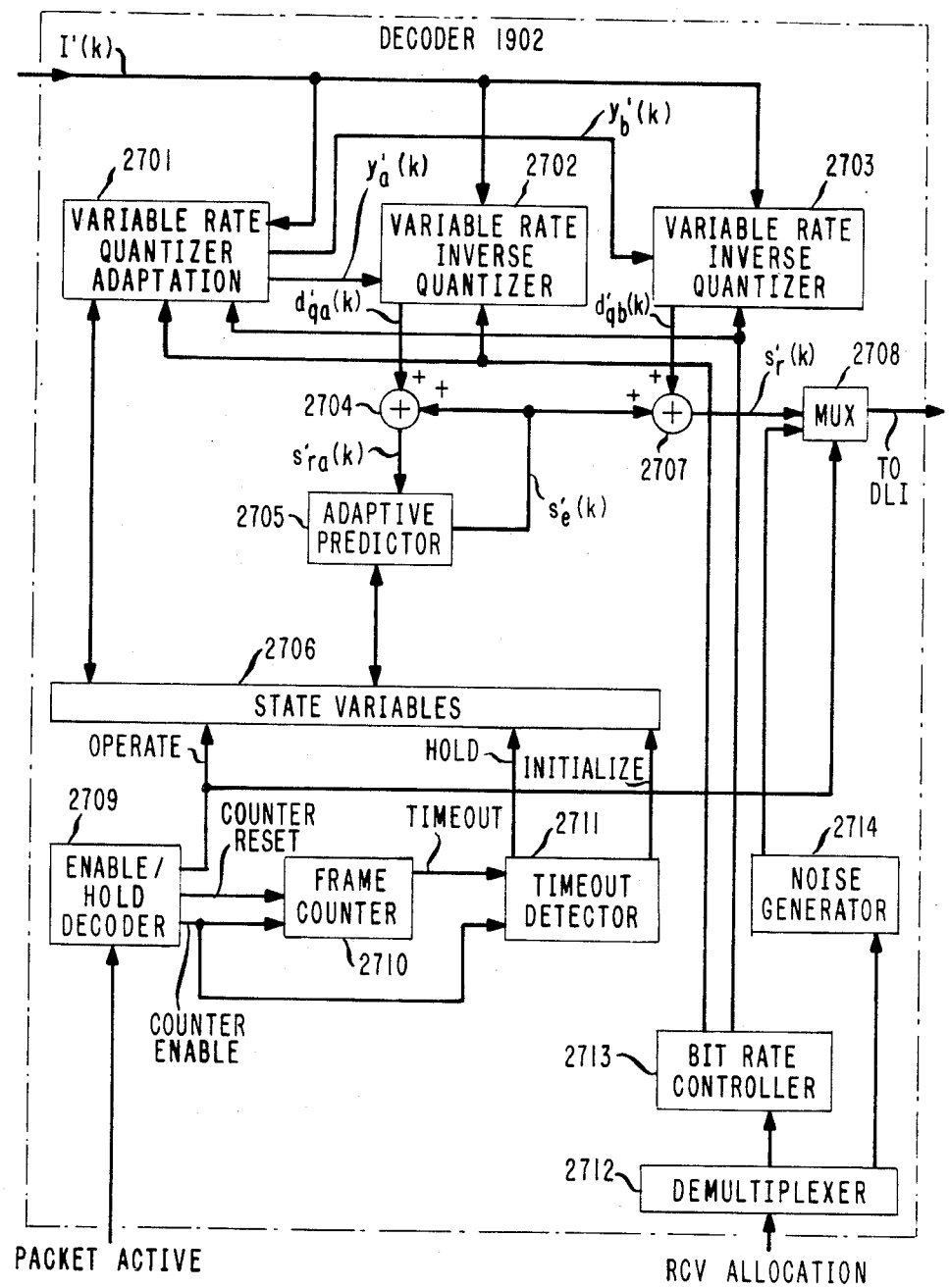
FIG. 27 depicts in simplified block diagram form details of decoder 1902 used in receive access modules 116 of FIG. 19.

FIG. 27 shows in simplified block diagram form details of decoder 1902 employed in receive access modules 116 of FIG. 19. Decoder 1902 is employed to decoder ADPCM signals back into PCM signals. In this example, 4-bit, 3-bit or 2-bit ADPCM samples are decoded into linear PCM form. Additionally, the ADPCM samples may include so-called embedded coding. For example, the samples may be 4/3-bit embedded coding, 4/2-bit embedded coding or 3/2-bit embedded coding. As indicated above, such coding arrangements are known in the art. Again, see U.S. Pat. No. 4,437,087 for an adaptive ADPCM decoder arrangement.

Accordingly, in FIG. 27 the ADPCM samples I'(k) from packet disassembler 1901 (FIG. 19) are supplied to variable rate quantizer adaptation unit 2701, variable rate inverse quantizer 2702 and variable rate inverse quantizer 2703. Variable rate quantizer adaptation unit 2701 is identical to variable rate quantizer adaptation unit 2503 of encoder 204 described above and is responsive to control siganls from bit rate controller 2713 to select the appropriate one or ones of the plurality quantizer adaptation units (not shown) to generate scale factor $y'_a(k)$ and $Y'_b(k)$.

Figure 28:
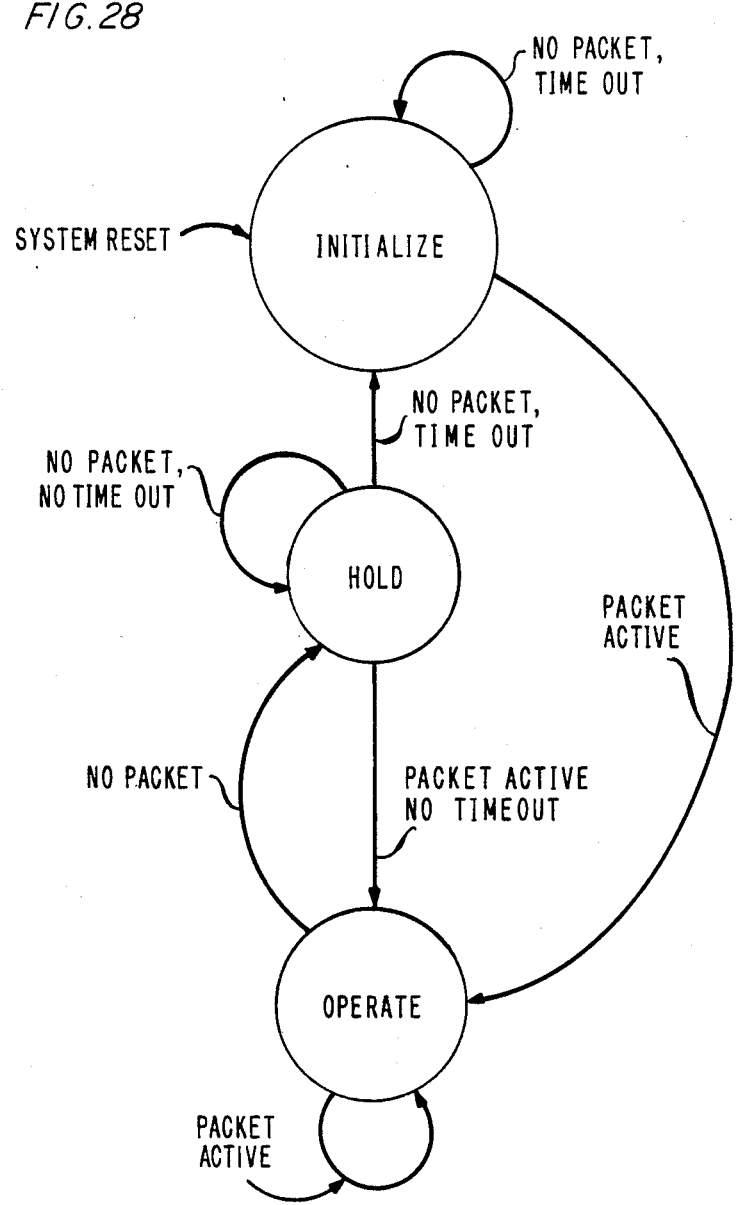
FIG. 28 shows a state diagram illustrating operation of aspects of decoder 1902.

Scale factor $y'_a(k)$ is supplied to the selected one of the inverse quantizers in variable rate inverse quantizer 2702. Similarly, scale factor y'b(k) is supplied to the selected one of the inverse quantizers in variable rate inverse quantizer 2703. Variable rate inverse quantizer 2702 and variable rate inverse quantizer 2703 each includes a pluralityof adaptive inverse quantizers. In this example, a 4-bit adaptive inverse quantizer, a 3-bit adaptive inverse quantizer and a 2-bit adaptive inverse quantizer. Both variable rate inverse quantizer 2702 and variable rate inverse quantizer 2703 are identical to variable rate inverse quantizer 2504 of encoder 204 described above. The particular adaptive inverse quantizer used in variable rate inverse quantizer 2702 and in variable rate inverse quantizer 1703 depends on the ADPCM coding being used, i.e., 4-bit, 3-bit, 2-bit, 4/3-bit embedded coding, 4/2-bit embedded coding or 3/2-bit embedded coding. Variable rate inverse quantizer 2702 generates a quantized version of the original difference sample $d'_{qa}(k)$ which is supplied to summer 2704. Similarly, variable rate inverse quantizer 2703 generates a quantized version of the difference sample $d'_{qb}(k)$. Quantized difference samples $d'_{qa}(k)$ and $d'_{qb}(k)$ are the same for the 4-bit, 3-bit and 2-bit ADPCM coding but are different for the embedded coding. For example, if the ADPCM coding is 4/2-bit embedded coding, the adaptive inverse quantizer selected in variable rate inverse quantizer 2702 is a 4-bit type and the adaptive inverse quantizer selected in variable rate inverse quantizer 2703 is a 2-bit type. In this example, the packet network could drop the 2 bits which are not used in variable rate inverse quantizer 2703 without affecting operation of this inverse quantizer. It is further noted that the type of inverse quantizer, i.e., 4-bit, 3-bit or 2-bit, used in inverse variable rate inverse quantizer 2702 is dependent also on whether bits have been dropped. For example, if two bits have been dropped, then a 2-bit inverse quantizer is used in variable rate inverse quantizer 2702. The quantized difference sample $d'_{qb}(k)$ is supplied to summer 2707. Also supplied to summers 2704 and 2707 is sample estimate $s'_e(k)$ from adaptive predictor 2705. The output from sumemr 2704 is first reconstructed sample $s'_{ra}(k)$ which is supplied to adaptive predictor 2705. The output from summer 2707 is the desired output, namely, second reconstructed sample $s'_{rb}(k)$ which is supplied to multiplexer 2708. A noise signal from noise generator 2714 is also supplied to multiplexer 2708. The noise generator 2714 generates an appropriate noise signal in response to the noise estimate (NE) signal supplied thereto via multiplexer 2712 and the RCV allocation signal from packet disassembler 1901. The noise signal is inserted via multiplexer 2708 when the operate signal is false, i.e., when no packet is present in the particular time slot. Again, for simplicity and clarity of description, the state variables of variable rate quantizer adaptation unit 2701 and adaptive predictor 2705 are shown as state variables unti 2706. As will be apparent to those skilled in the art, the state variables of variable rate quantizer adaptation unit 2701 are included in an adaptation speed control and a quantizer scale factor adaptation unit in each of the plurality of quantizer adaptation units as described above in relationship to state variables unit 2507 (FIG. 25). Enable/hold decoder 2709, frame counter 2710 and time-out detector 2711 operate in identical fashion to enable/hold decoder 2508, frame counter 2509 and time-out detector 2511, respectively, of encoder 204 (FIG. 25) as shown in the state diagram of FIG. 28 and, consequently, will not be described again in detail. The only difference being that the packet active signal and the rcv allocation signal are supplied from packet disassembler 1901. It is important to note that both the encoder 204 and decoder 1902 are controlled in similar fashion to recover from errors and gaps so that the decoder 1902 tracks what has happened at the encoder 204. In particular, decoder 1902 will, in accordance with an aspect of the invention, hold its state variables constant, rather than initialize them and thereby mistrack encoder 204 if the packet network 103 introduces a small gap in an information spurt that had been encoded without any such small gaps. Thus, by holding the state variables decoder 1902 more closely tracks encoder 204. Additionally, encoder 204 and decoder 1902 both initialize their state variables after long gaps, which eliminates, in accordance with an aspect of the invention, any mistracking caused by transmission errors or lost packets in the network.

Demultiplexer 2712 is supplied with the receive (RCV) allocation signal from packet disassembler 1901 and is operative to supply the receive status (RS) portion to bit rate controller 2713 and the noise estimate (NE) portion to noise generator 2714. Bit rate controller 2713, in response to the receive status signal, generates the code rate control signals for selecting (depending on the ADPCM coding being used) the appropriate quantizer adaptation unit or units in variable rate quantizer adaptation unit 2701 and the appropriate adaptive inverse quantizers in variable rate inverse quantizers 2702 and 2703. Multiplexer 2708 is responsive to the operate signal from enable/hold decoder 2709 to supply either reconstructed sample s'$_r$(k) or the noise signal to the digital line interface (DLI). Specifically, when the operate signal is true, the reconstructed sample s'$_r$(k) is supplied via multiplexer 2708 to the corresponding DLI and when the operate signal is false, the noise signal is supplied via multiplexer 2708 to the corresponding DLI.

What is claimed is:

1. Apparatus for transmitting packets, comprising,
    means for generating a packet including at least a packet header sequence number field,
    means for generating a repeating sequence of numbers,
    means for identifying the first packet in an information spurt, and
    means for inserting one of the numbers of said sequence of numbers into said packet header sequence number field for a packet being generated and for inserting a distinct number in place of said one of the numbers from said sequence of numbers when the packet being generated is identified as the first packet in the information spurt.

2. The apparatus as defined in claim 1 wherein said means for generating said sequence of numbers increments to the next number in said sequence for each packet that is generated.

3. The apparatus as defined in claim 2 wherein said distinct number is different than the numbers of said sequence of numbers.

4. Apparatus for reformatting digital samples from packets, each of the packets including an information field and a header having at least a time stamp field, the apparatus comprising,
    means for storing packet information fields,
    means for generating a local time signal,
    means for obtaining a packet originate time value for each received packet, said last named means including means for obtaining the difference between the value of the local time signal upon a packet arriving at the apparatus and a value from the time stamp field from said arriving packet, and
    means responsive to said packet originate time value for each of said received packets and said local time signal for controllably reading out samples from the stored information field for each of said received packets from said means for storing so that a fixed overall delay interval is obtained for each of said received packets.

5. The apparatus as defined in claim 4 wherein said means for controllably reading out samples from said means for storing includes means responsive to said packet originate time value for a corresponding received packet for generating a first time value for reading out samples from said packet information fields for said corresponding received packet.

6. The apparatus as defined in claim 5 wherein said means for controllably reading out samples from said means for storing further includes means for initiating reading out said information field samples for a corresponding received packet when the value of said local time signal is equal to said first time value.

7. The apparatus as defined in claim 6 wherein said means for generating said first time value comprises means for summing said packet originate time value for a corresponding received packet and a predetermined delay value.

8. The apparatus as defined in claim 5 further including means responsive to said first time value and said local time signal for determining whether a corresponding received packet is late arriving at a network node.

9. The apparatus as defined in claim 8 wherein said means for determining whether a corresponding received packet is late arriving includes means for obtaining a first algebraic difference value between the present value of the local time signal and said first time value, means for determining whether said first algebraic difference value is within first prescribed limits, wherein a late packet signal is generated if said first algebraic difference value is not within said first prescribed limits, and means responsive to said late packet signal for discarding the late arriving packet.

10. The apparatus as defined in claim 9 wherein said means for determining whether said corresponding received packet is late arriving further includes means for obtaining a second algebraic difference value between said packet originate time and the present value of said local time signal, and means for determining whether said second algebraic difference value is within second prescribed limits, wherein a late packet signal is generated if said second algebraic difference value is not within said second prescribed limits.

11. Apparatus for reformatting digital samples from packets, comprising,
    means for storing packet information fields,
    means for generating a local time signal,
    means for obtaining a packet sequence number for a particular packet, means for generating a first time value representative of a local time signal value at which reading out of samples of the particular packet information field from said means for storing is to be initiated, means responsive to said packet sequence number for generating an indication signal indicative of whether said particular packet is a scheduled packet, and means responsive to said indication signal, said first time value and said local time signal for controlling delay in reading out samples of the information field for said particular packet from said means for storing so that a fixed overall delay is obtained.

12. The apparatus as defined in claim 11 wherein said means for controllably reading out samples from said means for storing further includes means responsive to said indication signal for initiating reading out said information field samples for said particular packet when the value of said local time signal is equal to said first time value when said indication signal indicates that said particular packet is a scheduled packet.

13. The apparatus as defined in claim 12 wherein said means for initiating reading out samples from said means for storing is further responsive to said indication signal for initiating reading out said information field samples for said particular packet from said means for storing immediately upon termination of reading out samples of the information field of a last previous packet when said indication signal indicates that the particular packet is not a scheduled packet.

14. The apparatus as defined in claim 13 wherein said means for generating said first time value includes means for obtaining a packet originate time for said particular packet and means for summing said packet originate time value for the particular packet and a predetermined delay value.

15. The apparatus as defined in claim 14 wherein said packets each include a header having at least a time stamp field and wherein said means for obtaining said packet originate time value includes means for obtaining the difference between the value of the local time signal upon the particular packet arriving at the apparatus and a value from the time stamp field of the arriving particular packet.

16. Apparatus for reformatting digital samples from packets, comprising, means for storing packet information fields, means for obtaining a packet sequence number for a particular packet, said sequence number being a number in a predetermined first virtual sequence or a distinct number replacing one of said numbers in said first virtual sequence when said particular packet is an initial packet in an information spurt, means responsive to said packet sequence number for generating an indication signal indicative of whether said particular packet is a scheduled packet, said indication signal having a first state when said particular packet is a scheduled packet and a second state when said particular packet is not a scheduled packet, said indication signal generating means being responsive to said distinct number to generate said first state indication signal for the corresponding particular packet, and means responsive to said indication signal for controlling delay in reading out samples of the information field for said particular packet from said means for storing so that a fixed overall delay is obtained.

17. The apparatus as defined in claim 16 further including means for determining whether the sequence number for the particular packet is in sequence in said first virtual sequence, and wherein said means for generating said indication signal generates a first state indication signal when said sequence number for said particular packet is out of sequence in said first virtual sequence and a second state indication signal when said sequence number for said particular packet is in sequence in said first virtual sequence.

18. The apparatus as defined in claim 17 wherein said means for determining whether said particular packet sequence number is out of sequence includes means for generating a second virtual sequence of numbers corresponding to said first virtual sequence and means for setting the sequence number in said second virtual sequence equal to the sequence number of said particular packet when it is determined that the sequence number for the particular packet is out of sequence in said first virtual sequence.

19. The apparatus as defined in claim 18 further including means for generating a local time signal, means for generating a first time value representative of a local time signal value at which reading out of samples of the particular packet information field from said storing means is to be initiated, and wherein said means for controlling delay further includes means responsive to said indication signal, said first time value and said local time signal for controllably reading out samples of said particular packet information field from said means for storing so that a fixed overall delay is obtained.

20. The apparatus as defined in claim 19 wherein said means for controllably reading out samples from said means for storing further includes means responsive to said first state indication signal for initiating reading out said information field samples for said particular packet when the value of said local time signal is equal to said first time value.

21. The apparatus as defined in claim 20 wherein said means for initiating reading out samples from said means for storing is further responsive to said second state indication signal for initiating reading out said information field samples for said particular packet from said means for storing immediately upon termination of reading out samples of the information field of a last previous packet.

22. The apparatus as defined in claim 21 wherein said means for generating said first time value includes means for obtaining a packet originate time for said particular packet and means for summing said packet originate time value for the particular packet and a predetermined delay value.

23. The apparatus as defined in claim 22 wherein said packets each include a header having at least a time stamp field and wherein said means for obtaining said packet originate time value includes means for obtaining the difference between the value of the local time signal upon the particular packet arriving at the apparatus and a value from the time stamp field of the arriving particular packet.

24. A method for transmitting packets, comprising the steps of, generating a packet including at least a packet header sequence number field, generating a repeating sequence of numbers, inserting one of the numbers of said sequence of numbers into said packet header sequence number field for a packet being generated, identifying the first packet in an information spurt, and inserting a distinct number in place of said one of the numbers from said sequence of numbers when the packet being generated is identified as the first packet in the information spurt.

25. A method of reformatting digital samples from packets, each of the packets including an information field and a header having at least a time stamp field, comprising the steps of, storing packet information fields, generating a local time signal, obtaining a packet originate time value for a particular packet, said last step including the step of obtaining the difference between the value of the local time signal upon said particular packet arriving and a value from the time stamp field from said particular arriving packet, and utilizing said packet originate time value for said particular packet and said local time signal for controllably reading out samples from the stored information field for said particular packet so that a fixed overall delay interval is obtained.

26. A method of reformatting digital samples from packets, comprising the steps of, storing packet information fields, generating a local time signal, obtaining a packet sequence number for a particular packet, generating in response to said sequence number an indication signal indicative of whether said particular packet is a scheduled packet, generating a first time value representative of a local time signal value at which reading out of samples of the stored information field for said particular packet is to be initiated, and utilizing said indication signal, said first time value and said local time signal for controlling delay in reading out samples from the stored information field for said particular packet so that a fixed overall delay interval is obtained.

27. A system including a transmitter for generating packets to be transmitted to a remote receiver where they are reformatted into digital samples, comprising, in the transmitter, means for generating a packet including at least a packet header sequence number field, means for generating a repeating sequence of numbers, means for identifying the first packet in an information spurt, and means for inserting one of the numbers of said sequence of numbers into said packet header sequence number field for a packet being generated and for inserting a distinct number in place of said one of the numbers from said sequence of numbers when the packet being generated is identified as the first packet in the information spurt, and in the receiver, apparatus for reformatting digital samples form packets, comprising, means for storing packet information fields, means for obtaining a packet sequence number for a particular packet from said packet header sequence nubmer field, and means responsive to said packet sequence number for controlling delay in reading out samples of the information field for said particular packet from said means for storing so that a fixed overall delay is obtained.

* * * * *

UNITED STATES PATENT AND TRADEMARK OFFICE
CERTIFICATE OF CORRECTION

PATENT NO. : 4,748,620

DATED : May 31, 1988

INVENTOR(S) : Harry W. Adelmann and James D. Tomcik

It is certified that error appears in the above-identified patent and that said Letters Patent is hereby corrected as shown below:

Column 1, line 51 "transmission in" should read --transmission is--. Column 2, line 3 "theeh" should read --the--; line 32 "alos" should read --also--; line 33 "lsot" should read --lost--. Column 3, line 60 "simlified" should read --simplified--. Column 10, line 51 "a shown" should read --as shown--; line 62 "being" should read --begin--. Column 11, line 12 "test" should read --tests--. Column 21, line 7 "the the" should read --the--. Column 22, line 49 "RELEAE" should read --RELEASE--. Column 24, line 17 "a" should read --as--. Column 25, line 12 "indicated" should read --indicating--; line 28 "processee" should read --processed--; line 59 "palyout" should read --playout--. Column 26, line 26 "overlfowed" should read --overflowed--; line 27 "logicla" should read --logical--. Column 27, line 30 "setps" should read --steps--. Column 28, line 56 "times to" should read --times out--. Column 30, line 32 "ot" should read --to--. Column 31, line 7 "fo" should read --of--. Column 31, line 17 "tha" should read --that--; line 56 "proces" should read --process--. Column 34, line 13 "pluralityof" should read --plurality of--; line 64 "unti 27" should read --unit 27--. Column 40, line 26 "form" should read --from--; line 30 "nubmer" should read --number--.

Signed and Sealed this

Eighteenth Day of April, 1989

*Attest:*

DONALD J. QUIGG

*Attesting Officer*  *Commissioner of Patents and Trademarks*